US009800895B2

(12) United States Patent
Thirumalai et al.

(10) Patent No.: US 9,800,895 B2
(45) Date of Patent: Oct. 24, 2017

(54) DEPTH ORIENTED INTER-VIEW MOTION VECTOR PREDICTION

(71) Applicant: QUALCOMM Incorporated, San Diego, CA (US)

(72) Inventors: Vijayaraghavan Thirumalai, San Diego, CA (US); Li Zhang, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 14/316,145

(22) Filed: Jun. 26, 2014

(65) Prior Publication Data

US 2015/0003529 A1 Jan. 1, 2015

Related U.S. Application Data

(60) Provisional application No. 61/840,400, filed on Jun. 27, 2013, provisional application No. 61/847,942, (Continued)

(51) Int. Cl.
*H04N 19/597* (2014.01)
*H04N 19/56* (2014.01)
(Continued)

(52) U.S. Cl.
CPC .......... *H04N 19/597* (2014.11); *H04N 19/52* (2014.11); *H04N 19/70* (2014.11)

(58) Field of Classification Search
None
See application file for complete search history.

(56) References Cited

U.S. PATENT DOCUMENTS

2007/0223588 A1* 9/2007 Lee .................... H04N 19/56 375/240.16
2012/0056874 A1 3/2012 Kim et al.
(Continued)

FOREIGN PATENT DOCUMENTS

WO 2012171442 A1 12/2012
WO 2013053309 A1 4/2013

OTHER PUBLICATIONS

Wiegand et al., "WD1: Working Draft 1 of High-Efficiency Video Coding," JCTVC-C403, 3rd Meeting: Guangzhou, CN, Oct. 7-15, 2010, 137 pp.

(Continued)

*Primary Examiner* — Mohammad J Rahman
(74) *Attorney, Agent, or Firm* — Shumaker & Sieffert, P.A.

(57) ABSTRACT

An example video coding device is configured to compare an inter-view predicted motion vector candidate (IPMVC) to a motion vector inheritance (MVI) candidate, where the IPMVC and the MVI candidate are each associated with a block of video data in a dependent depth view, and where the IPMVC is generated from a corresponding block of video data in a base depth view. The video coding device may be further configured to perform one of adding the IPMVC to a merge candidate list based on the IPMVC being different from the MVI candidate, or omitting the IPMVC from the merge candidate list based on the IPMVC being identical to the MVI candidate.

30 Claims, 13 Drawing Sheets

Related U.S. Application Data filed on Jul. 18, 2013, provisional application No. 61/890,107, filed on Oct. 11, 2013.

(51) Int. Cl.
*H04N 19/51* (2014.01)
*H04N 19/52* (2014.01)
*H04N 19/70* (2014.01)

(56) References Cited

U.S. PATENT DOCUMENTS

2013/0004093 A1 1/2013 Sugio et al.
2013/0034171 A1* 2/2013 Winken ............... H04N 19/597 375/240.25
2013/0039423 A1* 2/2013 Helle ................... H04N 19/197 375/240.13
2013/0257861 A1 10/2013 Kim et al.
2013/0287289 A1* 10/2013 Tian ..................... H04N 19/597 382/154
2013/0322540 A1* 12/2013 Yamori ................ H04N 19/597 375/240.16
2014/0092208 A1* 4/2014 Zou ...................... H04N 19/597 348/43
2014/0092210 A1* 4/2014 Tian .................. H04N 13/0048 348/43
2014/0092968 A1* 4/2014 Guillemot ............ H04N 19/597 375/240.14
2014/0092981 A1* 4/2014 Lin ........................ H04N 19/52 375/240.16
2014/0241434 A1* 8/2014 Lin ...................... H04N 19/597 375/240.16
2015/0003521 A1* 1/2015 Thirumalai .......... H04N 19/597 375/240.08
2015/0043635 A1* 2/2015 Jung ...................... H04N 19/44 375/240.12
2015/0049814 A1* 2/2015 Sung .................... H04N 19/597 375/240.16
2015/0098509 A1* 4/2015 Sung .................... H04N 19/597 375/240.16
2015/0146103 A1* 5/2015 Koo ..................... H04N 19/597 348/607
2015/0195506 A1* 7/2015 Lin ...................... H04N 19/597 375/240.16
2015/0195569 A1* 7/2015 Jung .................... H04N 19/597 375/240.16
2015/0201216 A1 7/2015 Lin et al.
2015/0264397 A1 9/2015 Lin et al.
2015/0288983 A1* 10/2015 Koo ..................... H04N 19/597 375/240.12
2015/0350678 A1* 12/2015 Shimizu ............... H04N 19/523 375/240.16

OTHER PUBLICATIONS

Wiegand et al., “WD2: Working Draft 2 of High-Efficiency Video Coding,” JCTVC-D503, 4th Meeting: Daegu, KR, Jan. 20-28, 2011, 153 pp.
Wiegand et al., “WD3: Working Draft 3 of High-Efficiency Video Coding,” Document JCTVC-E603, 5th Meeting: Geneva, CH, Mar. 16-23, 2011, 193 pp.
Bross et al., “WD4: Working Draft 4 of High-Efficiency Video Coding,” 6th Meeting: JCTVC-F803_d2, Torino, IT, Jul. 14-22, 2011, 226 pp.
Bross et al., “WD5: Working Draft 5 of High-Efficiency Video Coding,” 7th Meeting: Geneva, CH, Nov. 21-30, 2011, JCTVC-G1103_d2, 214 pp.
Bross et al., “High efficiency video coding (HEVC) text specification draft 6,” 8th Meeting: San Jose, CA, USA, Feb. 1-10, 2012, JCTVC-H1003, 259 pp.
Bross et al., “High efficiency video coding (HEVC) text specification draft 7,” 9th Meeting: Geneva, CH, Apr. 27-May 7, 2012, JCTVC-I1003_d2, 290 pp.
Bross et al., “High efficiency video coding (HEVC) text specification draft 8,” 10th Meeting: Stockholm, SE, Jul. 11-20, 2012, JCTVC-J1003_d7, 261 pp.
Bross et al., “High Efficiency Video Coding (HEVC) text specification draft 9,” 11th Meeting: Shanghai, CN, Oct. 10-19, 2012, JCTVC-K1003_v7, 290 pp.
Bross et al., “High Efficiency Video Coding (HEVC) text specification draft 10 (for FDIS & Last Call),” 12th Meeting: Geneva, CH, Jan. 14-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
An et al., “3D-CE2.h related: Inter-view scaling for DV derivation,” JCT-3V Meeting; Apr. 20-26, 2013; Incheon, KR; (The Joint Collaborative Team on 3D Video Coding Extension Development of ISO/IEC JTC1/SC29/WG11 and ITU-T SG.16); URL: http://phenix.int-evry.fr/jct2/, No. JCT3V-D0149, XP030130813, 4 pp.
Chen et al., “3D-CE3.h results on removal of parsing dependency and picture buffers for motion parameter inheritance,” JCT-3V Meeting; MPEG Meeting; Jan. 17-23, 2013; Geneva, CH; (The Joint Collaborative Team on 3D Video Coding Extension Development of ISO/IEC JTC1/SC29/WG11 and ITU-T SG.16); URL: http://phenix.int-evry.fr/jct2/, No. JCT3v-00137, XP030130553, 4 pp.
Guillemot et al., “3D-CE5.h: Additional merge candidates derived from shifted disparity candidate predictors,” JCT-3V Meeting, MPEG Meeting, Jan. 17-23, 2013; Geneva, CH, (The Joint Collaborative Team on 3D Video Coding Extension Development of ISO/IEC JTC1/SC29/WG11 and ITU-T SG.16 ), URL: http://phenix.int-evry.fr/jct2/, No. JCT3V-00148, XP030130564, 6 pp.
Lin et al., “3D-CE5.h related: Additional inter-view merging candidate,” JCT-3V Meeting; Apr. 20-26, 2013; Incheon, KR; (The Joint Collaborative Team on 3D Video Coding Extension Development of SO/IEC JTC1/SC29/WG11 and ITU-T SG.16); URL: http://phenix.int-evry.fr/jct2/, No. JCT3V-D0109, XP030130773, 3 pp.
Schwarz et al., “Description of 3D Video Coding Technology Proposal by Fraunhofer HHI (HEVC compatible configuration B),” MPEG Meeting; Nov. 2011; Geneva, CH; (Motion Picture Expert Group or ISO/IEC JTC1/SC29/WG11), No. M22571, XP030051134, 46 pp.
Tao et al., “Joint Texture and Depth Map Video Coding Based on the Scalable Extension of H.264/AVC,” Circuits and Systems, May 2009. ISCAS 2009. IEEE International Symposium on, IEEE, Piscataway, NJ, USA, XP031479714, pp. 2353-2356.
Thirumalai et al., “CE5.h: Merge candidates derivation from vector shifting,” JCT-3V Meeting; Apr. 20-26, 2013; Incheon, KR; (The Joint Collaborative Team on 3D Video Coding Extension Development of ISO/IEC JTC1/SC29/WG11 and ITU-T SG.16); URL: http://phenix.int-evry.fr/jct2/, No. JCT3V-D0178, XP030130842, 5 pp.
Thirumalai et al., “Inter-view motion vector prediction for depth coding,” JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/jct2/, No. JCT3V-E0133-v3, XP030131152, 6 pp.
Zhao et al., “CE3: Inter-view motion vector prediction for depth coding,” JCT-3V Meeting; Oct. 25-Nov. 1, 2013; Geneva, CH; (The Joint Collaborative Team on 3D Video Coding Extension Develop-

(56) References Cited

OTHER PUBLICATIONS ment of ISO/IEC JTC1/SC29/WG11 and ITU-T SG.16); URL: http://phenix.int-evry.fr/jct2/, No. JCT3V-F0125, XP030131550, 6 pp.

Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, Document: JCTVC_K1003_v10, 306 pp.

Tech et al., "3D-HEVC Test Model 4," JCT-3V 4th Meeting; Incheon, KR; (The Joint Collaborative Team on 3D Video Coding Extension Development of ISO/IEC JTC1/SC29/WG11 and ITU-T SG.16), No. JCT3V-D1005-spec-v1, Apr. 20-26, 2013, XP030130998, 8 pp.

Tian et al.,"CE1.h: Backward View Synthesis Prediction using Neighbouring Blocks," JCT-3V Meeting; MPEG Meeting; Jan. 16-23, 2013; Geneva, CH; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-00152, XP030130568, 5 pp.

International Search Report and Written Opinion from International Application No. PCT/US2014/044600, dated Sep. 23, 2014, 14 pp.

Response to Written Opinion dated Sep. 23, 2014, from International Application No. PCT/US2014/044600, filed on Apr. 27, 2015, 6 pp.

Second Written Opinion from International Application No. PCT/US2014/044600, dated Jun. 17, 2015, 6 pp.

Response to Second Written Opinion dated Jun. 17, 2015, from International Application No. PCT/US2014/044600, filed on Aug. 17, 2015, 25 pp.

International Preliminary Report on Patentability from International Application No. PCT/US2014/044600, dated Oct. 7, 2015, 12 pp.

* cited by examiner

Prediction structure of advanced residual prediction.

DEPTH ORIENTED INTER-VIEW MOTION VECTOR PREDICTION

This application claims the benefit of:

U.S. Provisional Application No. 61/840,400, filed Jun. 27, 2013;

U.S. Provisional Application No. 61/847,942, filed Jul. 18, 2013; and

U.S. Provisional Application No. 61/890,107, filed Oct. 11, 2013, the entire contents each of which are incorporated by reference herein.

TECHNICAL FIELD

This disclosure relates to video coding and, more specifically, to three-dimensional (3D) video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called “smart phones,” video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure describes video coding techniques. The techniques are generally related to the coding of three-dimensional video (3DV) content, consisting of texture views and depth views. Various techniques of this disclosure relate to inter-view motion vector prediction for depth views. According to various examples, the techniques are directed to improving accuracy of motion vector prediction for dependent depth views by leveraging a greater number of motion vector candidates from already-coded motion information for a depth base view. For instance, the techniques may enable a disparity vector to be derived from neighboring depth pixels of a depth block in the dependent depth view, and use the disparity vector to derive motion vector candidates (e.g., with which to populate a merge list) from the base depth view.

In one example, this disclosure describes a method of coding video data, the method including determining a depth value associated with a block of video data included in a dependent depth view based on one or more neighboring pixels positioned adjacent to the block of video data in the dependent depth view, and generating a disparity vector associated with the block of video data based at least in part on the determined depth value associated with the block of video data. The method may further include generating an inter-view disparity motion vector candidate (IDMVC) based on the disparity vector, generating an inter-view predicted motion vector candidate (IPMVC) associated with the block of video data based on a corresponding block of video data in a base view, and determining whether to add any of the IDMVC or the IPMVC to a merge candidate list associated with the block of video data.

In another example, this disclosure describes a device for coding video data, the device including a memory and one or more processors. The one or more processors may be configured or otherwise operable to determine a depth value associated with a block of video data included in a dependent depth view, based on one or more neighboring pixels positioned adjacent to the block of video data in the dependent depth view, and generate a disparity vector associated with the block of video data, based at least in part on the determined depth value associated with the block of video data. The one or more processors may further be configured or operable to use the disparity vector to generate an inter-view disparity motion vector candidate (IDMVC), generate an inter-view predicted motion vector candidate (IPMVC) associated with the block of video data based on a corresponding block of video data in a base view, and determine whether to add any of the IDMVC and the IPMVC to a merge candidate list associated with the block of video data.

In another example, this disclosure describes a computer-readable storage medium encoded with instructions that, when executed, cause one or more processors of a video coding device to determine a depth value associated with a block of video data included in a dependent depth view, based on one or more neighboring pixels positioned adjacent to the block of video data in the dependent depth view, generate a disparity vector associated with the block of video data, based at least in part on the determined depth value associated with the block of video data, use the disparity vector to generate an inter-view disparity motion vector candidate (IDMVC), generate an inter-view predicted motion vector candidate (IPMVC) associated with the block of video data based on a corresponding block of video data in a base view, and determine whether to add any of the IDMVC and the IPMVC to a merge candidate list associated with the block of video data.

In another example, this disclosure describes an apparatus for coding video data, the apparatus including means for determining a depth value associated with a block of video data included in a dependent depth view, based on one or more neighboring pixels positioned adjacent to the block of video data in the dependent depth view, means for generating a disparity vector associated with the block of video data, based at least in part on the determined depth value associated with the block of video data, means for using the disparity vector to generate an inter-view disparity motion vector candidate (IDMVC), means for generating an inter-view predicted motion vector candidate (IPMVC) associated with the block of video data based on a corresponding block of video data in a base view, and means for determining whether to add any of the IDMVC and the IPMVC to a merge candidate list associated with the block of video data.

In another example, this disclosure describes a method of coding video data, the method including comparing an inter-view predicted motion vector candidate (IPMVC) to a motion vector inheritance (MVI) candidate, where the IPMVC and the MVI candidate are each associated with a block of video data in a dependent depth view, and where the IPMVC is generated from a corresponding block of video data in a base depth view. The method may further include performing one of adding the IPMVC to a merge candidate list based on the IPMVC being different from the MVI candidate, or omitting the IPMVC from the merge candidate list based on the IPMVC being identical to the MVI candidate.

In another example, this disclosure describes a device for coding video data, the device including a memory and one or more processors. The one or more processors may be configured or otherwise operable to compare an inter-view predicted motion vector candidate (IPMVC) to a motion vector inheritance (MVI) candidate, where the IPMVC and the MVI candidate are each associated with a block of video data in a dependent depth view, and where the IPMVC is generated from a corresponding block of video data in a base depth view. The one or more processors may be further configured or otherwise operable to perform one of adding the IPMVC to a merge candidate list based on the IPMVC being different from the MVI candidate, or omitting the IPMVC from the merge candidate list based on the IPMVC being identical to the MVI candidate.

In another example, this disclosure describes a computer-readable storage medium encoded with instructions that, when executed, cause one or more processors of a video coding device to compare an inter-view predicted motion vector candidate (IPMVC) to a motion vector inheritance (MVI) candidate, where the IPMVC and the MVI candidate are each associated with a block of video data in a dependent depth view, and where the IPMVC is generated from a corresponding block of video data in a base depth view. The instructions, when executed, may further cause the one or more processors of the video coding device to perform one of adding the IPMVC to a merge candidate list based on the IPMVC being different from the MVI candidate, or omitting the IPMVC from the merge candidate list based on the IPMVC being identical to the MVI candidate.

In another example, this disclosure describes an apparatus for coding video data, the apparatus including means for comparing an inter-view predicted motion vector candidate (IPMVC) to a motion vector inheritance (MVI) candidate, where the IPMVC and the MVI candidate are each associated with a block of video data in a dependent depth view, and where the IPMVC is generated from a corresponding block of video data in a base depth view. The apparatus may further include means for performing one of adding the IPMVC to a merge candidate list based on the IPMVC being different from the MVI candidate, or omitting the IPMVC from the merge candidate list based on the IPMVC being identical to the MVI candidate.

The details of one or more examples are set forth in the accompanying drawings and the description below. Other features, objects, and advantages will be apparent from the description and drawings, and from the claims.

DETAILED DESCRIPTION

Figure 1:
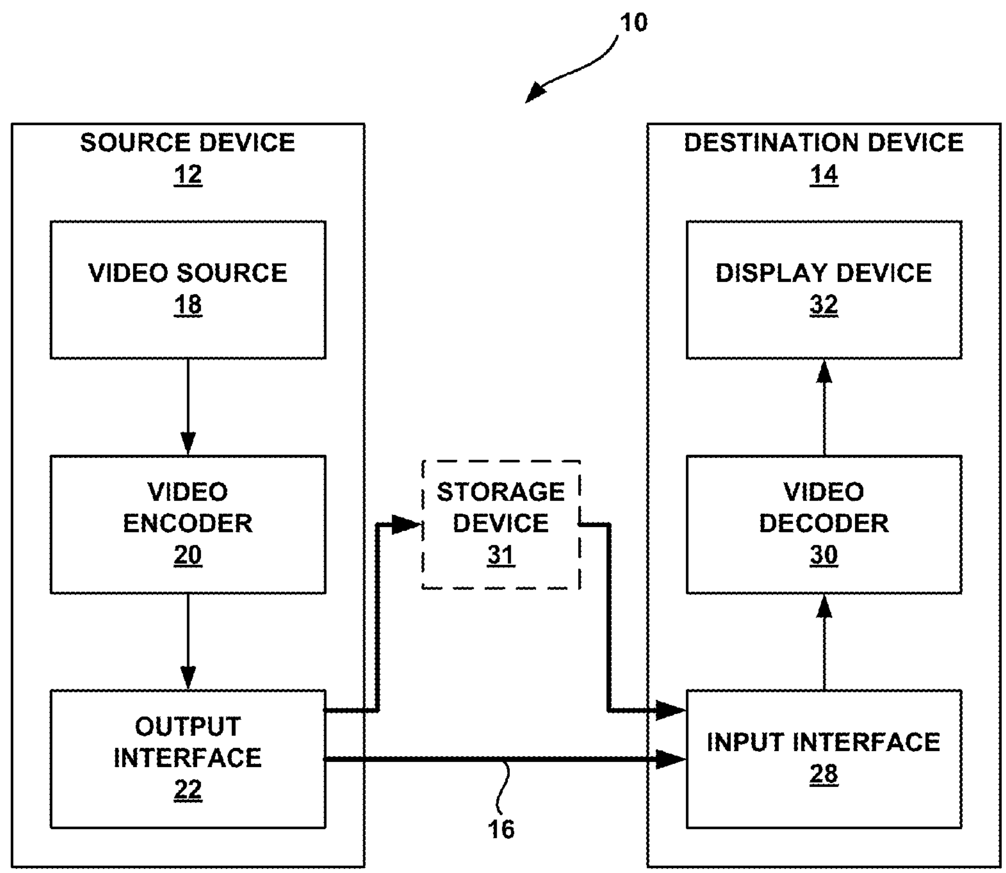
FIG. 1 is a block diagram illustrating an example video encoding and decoding system that may be configured to implement or otherwise utilize techniques for depth oriented inter-view motion vector prediction in video coding.

This disclosure describes various techniques for coding of 3D video content, consisting of texture views and depth views. The techniques may be performed, in some aspects, by a video encoder. In other aspects, the techniques may be performed by a video decoder. A base view may also be referred to herein as a "reference layer" or "reference view." Additionally, a view or layer other than the base layer may be referred to herein as a "dependent layer" or "dependent view." In addition, various techniques described herein may be performed by other devices, such as transcoders, media aware network elements (MANEs), or other devices or units that process video data. In this disclosure, the techniques are described with respect to video encoders and decoders, for purposes of illustration.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the Scalable Video Coding (SVC) and/or Multiview Video Coding (MVC) extensions of ITU-T H.264.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the Scalable Video Coding (SVC) and/or Multiview Video Coding (MVC) extensions of ITU-T H.264.

In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). One recent Working Draft (WD) of HEVC, and referred to as HEVC WD8 hereinafter, is available from http://phenix.int-evry.fr/jct/doc_end_user/documents/11_Shanghai/wg11/JCTVC-K1003-v10.zip. Another, more recent draft of HEVC, is referred to as "HEVC text specification draft 10" herein. The entire contents of HEVC WD8 (BROSS et al., "High efficiency video coding (HEVC) text specification draft 8," 10th Meeting: Stockholm, SE, 11-20 Jul. 2012, JCTVC-J1003_d7, 261 pp.) and HEVC draft 10 (BROSS et al., "High efficiency video coding (HEVC) text specification draft 10 (For FDIS & Last Call)," 10th Meeting: Geneva, CH, 14-23 Jan. 2013, JCTVC-L1003_v34, 310 pp.) are incorporated herein by reference.

One usage of HEVC may be in the area of high and ultra-high definition (UHD) video. Many high definition (HD) displays are already capable of rendering stereo video, and the increased resolution and display size of UHD displays may make such displays even more suitable for stereo video. Beyond that, the improved compression capability of HEVC (e.g., an expected half bit rate with same quality compared to H.264/AVC High profile) may make HEVC a good candidate for coding stereo video. For example, using mechanisms that exploit the redundancy between views, a video coder (e.g., a video encoder or video decoder) may be able to use HEVC to code full resolution stereo video at even lower rates than a single view (monoscopic) video of the same quality and resolution coded using the H.264/AVC standard.

Similarly to AVC-based projects, a Joint Collaboration Team on 3D Video Coding (JCT-3V) of VCEG and MPEG is conducting study of two 3DV solutions that are using the HEVC coding technology. The first is multi-view extension of HEVC, referred to as MV-HEVC and another is depth enhanced HEVC-based full 3DV codec, 3D-HEVC. Part of the standardization efforts includes the standardization of multi-view/3D Video coding based on HEVC. The latest software 3D-HTM version 5.0 is electronically available at https://hevc.hhi.fraunhofer.de/svn/svn_3DVCSoftware/tags/HTM-5.0/. The techniques described below may be implemented in conjunction with the two proposed 3DV solutions above.

In some instances, the techniques may also (or alternatively) be implemented with a scalable extension or multi-view extension to HEVC. In scalable video coding, multiple layers of video data may be coded. In some instances, each layer may correspond to a particular view. Here, the application of view scalability and spatial scalability are considered highly beneficial in the evolution of 3D services, as view scalability and spatial scalability allow for backward-compatible extensions (i.e., extensions that are operable or configured to operate with previous versions and/or releases of various codecs) for more views, and/or enhancing the resolution of views in a way that decoding by legacy (i.e., devices that implement a previous version and/or release of a particular codec) devices is possible.

In two-dimensional video coding, video data (that is, a sequence of pictures) is coded picture by picture, not necessarily in display order. Video coding devices divide each picture into blocks, and code each block individually. Block-based prediction modes include spatial prediction, also referred to as intra-prediction, and temporal prediction, also referred to as inter-prediction.

For three-dimensional video data, such as multiview or scalable coded data, blocks may also be inter-view and/or inter-layer predicted. As described herein, a video "layer" may generally refer to a sequence of pictures having at least one common characteristic, such as a view, a frame rate, a resolution, or the like. For example, a layer may include video data associated with a particular view (e.g., perspective) of multiview video data. As another example, a layer may include video data associated with a particular layer of scalable video data.

Thus, this disclosure may interchangeably refer to a layer and a view of video data. That is, a view of video data may be referred to as a layer of video data, and vice versa. Moreover, the terms inter-view prediction and inter-layer prediction may interchangeably refer to prediction between multiple layers and/or views of video data. In addition, multi-layer codec (or multi-layer video coder) may jointly refer to a multiview codec or a scalable codec.

In multiview or scalable video coding, blocks may be predicted from a picture of another view or layer of video data. In this manner, inter-view prediction based on reconstructed view components from different views may be enabled. This disclosure uses the term "view component" to refer to an encoded picture of a particular view or layer. That is, a view component may comprise an encoded picture for a particular view at a particular time (in terms of display order, or output order). A view component (or slices of a view component) may have a picture order count (POC) value, which generally indicates the display order (or output order) of the view component.

Typically, the same or corresponding objects of two views are not co-located. The term "disparity vector" may be used to refer to a vector that indicates displacement of an object in a picture of a view relative to the corresponding object in a different view. Such a vector may also be referred to as a "displacement vector." A disparity vector may also be applicable to a pixel or a block of video data of a picture. For example, a pixel in a picture of a first view may be displaced with respect to a corresponding pixel in a picture of a second view by a particular disparity vector related to differing camera locations from which the first view and second view are captured. In some examples, disparity vector can be used to predict the motion information (motion vector(s) with or without reference picture index(es)) from one view to another view.

Thus, to further improve the coding efficiency, a video coder may also apply inter-view motion prediction and/or inter-view residual prediction. With respect to inter-view motion prediction, a video coder may code a motion vector associated with a block of one view relative to a motion vector associated with a block of a second different view. However, while inter-view motion prediction has been used in texture views, inter-view motion prediction has not been used in depth views.

Techniques of this disclosure are generally directed to applying inter-view motion prediction to depth views. In various examples, a video coding device may implement one or more of the techniques may to derive a disparity vector from neighboring depth pixels of a depth block in the dependent depth view. In turn, the video coding device may implement the techniques to use the disparity vector to derive motion vector candidates (e.g., with which to populate a merge list) from the base depth view. By implementing the techniques described herein, the video coding device may improve accuracy of motion vector prediction for dependent depth views by leveraging a greater number of motion vector candidates from already-coded motion information for a depth base view. In other examples, techniques of this disclosure are directed to merge list construction using the motion vector candidates that are generated by applying inter-view motion prediction to depth views.

FIG. 1 is a block diagram illustrating an example video encoding and decoding system 10 that may be configured to implement or otherwise utilize techniques for depth oriented inter-view motion vector prediction in video coding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device, such as storage device 31. Similarly, encoded data may be accessed from the storage device 31 by input interface 28. Storage device 31 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 31 may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32.

The illustrated system 10 of FIG. 1 is merely one example. Techniques for depth oriented inter-view motion vector prediction may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may generally conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 24) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

In some instances, video encoder 20 and video decoder 30 may operate according to proprietary or industry standards, such as the ITU-T H.264 standard, alternatively referred to as MPEG-4, Part 10, Advanced Video Coding (AVC), or extensions of such standards. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT).

Video encoder 20 and video decoder 30 may additionally or alternatively operate according to another video coding standard, such as HEVC WD8. Furthermore, there are ongoing efforts to produce scalable video coding, multiview coding, and three-dimensional video (3DV) extensions for HEVC. Accordingly, in some instances, video encoder 20 and video decoder 30 may perform multiview video coding. For example, video encoder 20 and video decoder 30 may implement a multi-view extension of HEVC (referred to as MV-HEVC), a depth enhanced HEVC-based full 3DV codec (referred to as 3D-HEVC), or a scalable video coding extension of HEVC (referred to as SHEVC (scalable HEVC) or HSVC (high efficiency scalable video coding).

The techniques described below may be implemented in conjunction with one or more of the HEVC extensions noted above. For 3D-HEVC, new coding tools, including those in the coding unit/prediction unit level, for both texture and depth views may be included and supported. As of Nov. 21, 2013, software for 3D-HEVC (i.e., 3D-HTM version 5.0) can be downloaded from the following link: https://hevc.hhi.fraunhofer.de/svn/svn_3DVCSoftware/tags/HTM-5.0/.

Two-dimensional video data is generally coded as a sequence of discrete pictures, each of which corresponds to a particular temporal instance. That is, each picture has an associated playback time relative to playback times of other images in the sequence. These pictures may be considered texture pictures or texture images. A depth view component may indicate relative depths of the pixels in a corresponding texture view component. As one example, the depth view component is a gray scale image that includes only luma values. In other words, the depth view component may not convey any textural image content, but rather, the depth view component may provide a measure of the relative depths of the different pixels defined in the texture view component. The depth values in the depth view components may define the depth of the respective pixels relative to a zero disparity plane, or possibly some other reference. In depth-based 3D video coding, each texture picture in a sequence may also correspond to a depth map. That is, a depth map corresponding to a texture picture describes depth data for the corresponding texture picture. Multiview video data may include data for various different views, where each view may include a respective sequence of texture pictures and corresponding depth pictures.

Depth values generally correspond to texture data. For example, a depth image may include a set of depth pixels that each describes depth values for corresponding texture data. The depth values may be used to determine horizontal disparity for the corresponding texture data. Thus, a device that receives the texture data and depth values may display a first texture image for one view (e.g., a left eye view) and use the depth values to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in the right view, where the two pixels correspond to the same portion of the same object as represented in the two views.

In still other examples, depth values may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change. Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to slight perception of depth, or may be displayed in different locations for the left and right eye (e.g., with horizontal disparity that is opposite that of pixels located in front of the zero disparity plane). Various other techniques may also be used to convey or define depth data for an image.

Conceptually, a purely white pixel in the depth view component indicates that a corresponding pixel or pixels in the corresponding texture view component is closer from the perspective of the viewer, and a purely black pixel in the depth view component indicates that the corresponding pixel or pixels in the corresponding texture view component is further away from the perspective of the viewer. The various shades of gray in between black and white indicate different depth levels. For instance, a very gray pixel in the depth view component indicates that a corresponding pixel in the texture view component is further away than a slightly gray pixel in the depth view component. Because only gray scale is needed to identify the depth of pixels, the depth view component need not include chroma components, as color values for the depth view component may not serve any purpose. The depth view component using only luma values (e.g., intensity values) to identify depth is provided for illustration purposes and should not be considered limiting.

In a more general sense, the depth view components may comprise values ranging from a minimum value to a maximum value. According to one specific frame of reference, a pixel in the depth view component having a maximum depth value may define the depth of a respective pixel in the texture view component as further away from the viewer relative to a pixel in the texture view component corresponding to pixel in the depth-view component having a lower value. Consequently, a pixel in the depth view component having a minimum depth value may define the depth of a respective pixel in the texture view component as closer to the viewer relative to a pixel in the texture view component corresponding to pixel in the depth-view component having a higher value. In other examples, the frame of reference may be defined differently. For example, the frame of reference may be defined such that the meaning of the relatively higher and lower values is reversed. That is relatively lower values may correspond to a depth that is further away from the viewer and higher values may correspond to a depth that is closer to the view. In other examples, any technique may be utilized to indicate relative depths of the pixels in the texture view component.

In general, the motion compensation loop of HEVC is the same as that in H.264/AVC. For example, the reconstruction of a current frame $\hat{I}$ in the motion compensation loop may equal de-quantized coefficients r plus temporal prediction P:

$$\hat{I}=r+P.$$

In the formula above, P indicates uni-predictive inter prediction for P frames or bi-predictive inter prediction for B frames.

However, the unit of motion compensation in HEVC is different from that in previous video coding standards. For example, the concept of a macroblock in previous video coding standards does not exist in HEVC. Rather, macroblocks are replaced by a flexible hierarchical structure based on a generic quadtree scheme. Within this scheme, three types of blocks, i.e., coding units (CUs), prediction units (PUs), and transform units (TUs), are defined. A CU is a basic unit of region splitting. The concept of a CU is analogous to the concept of macroblock, but a CU is not restricted to a maximum size and a CU allows recursive splitting into four equally-sized CUs to improve the content adaptivity. A PU is a basic unit of inter/intra prediction. In some examples, a PU may contain multiple arbitrarily-shaped partitions in a single PU to effectively code irregular image patterns. A TU is a basic unit of transform. TUs of a CU can be defined independently from PUs of the CU. However, a size of a TU is limited to the CU to which the TU belongs. This separation of the block structure into three different concepts may allow each to be optimized according to a corresponding role, which may result in improved coding efficiency.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more CUs. A slice may include an integer number of CTUs ordered consecutively in a raster scan order.

A coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units or blocks may include CTUs, CUs, PUs, transform units (TUs), macroblocks, macroblock partitions, and so on. In some contexts, discussion of PUs may be interchanged with discussion of macroblocks of macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU. Hence, in this disclosure, a CU may be said to be partitioned into one or more PUs. For ease of explanation, this disclosure may refer to the size of a prediction block of a PU as simply the size of the PU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on samples of the picture associated with the PU. In this disclosure, the phrase "based on" may indicate "based at least in part on."

If video encoder 20 uses inter prediction to generate the predictive blocks of a PU, video encoder 20 may generate the predictive blocks of the PU based on decoded samples of one or more pictures other than the picture associated with the PU. When inter prediction is used to generate the predictive blocks of a block (e.g., a PU), this disclosure may refer to the block as "inter-coded" or "inter predicted." Inter prediction may be uni-predictive (i.e., uni-prediction) or bi-predictive (i.e., bi-prediction). To perform uni-prediction or bi-prediction, video encoder 20 may generate a first reference picture list (RefPicList0) and a second reference picture list (RefPicList1) for a current picture. Each of the reference picture lists may include one or more reference pictures. After a reference picture list is constructed (namely RefPicList0 and RefPicList1 if available), a reference index to a reference picture list can be used to identify any reference picture included in the reference picture list.

When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive blocks for the PU. Moreover, when using uni-prediction, video encoder 20 may generate a single motion vector that indicates a spatial displacement between a prediction block of the PU and the reference location. The motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may generate, based at least in part on samples corresponding to the first and second reference locations, the predictive blocks for the PU. Moreover, when using bi-prediction to encode the PU, video encoder 20 may generate a first motion vector indicating a spatial displacement between a prediction block of the PU and the first reference location and a second motion vector indicating a spatial displacement between the prediction block of the PU and the second reference location.

If video encoder 20 uses inter prediction to generate the predictive blocks of a PU, video encoder 20 may generate the predictive blocks of the PU based on samples of one or more pictures other than the picture associated with the PU. For instance, video encoder 20 may perform uni-predictive inter prediction (i.e., uni-prediction) or bi-predictive inter prediction (i.e., bi-prediction) on a PU.

In instances where video encoder 20 performs uni-prediction on a PU, video encoder 20 may determine, based on a motion vector of the PU, a reference location in a reference picture. Video encoder 20 may then determine a predictive block for the PU. Each sample in the predictive block for the PU may be associated with the reference location. In some examples, a sample in a predictive block for a PU may be associated with a reference location when the sample is within a block of samples having the same size as the PU and whose top-left corner is the reference location. Each sample in the predictive block may be an actual or interpolated sample of the reference picture.

In instances where luma samples of the predictive block are based on interpolated luma samples of the reference picture, video encoder 20 may generate the interpolated luma samples by applying an 8-tap interpolation filter to actual luma samples of the reference picture. In instances where chroma samples of the predictive block are based on interpolated chroma samples of the reference picture, video encoder 20 may generate the interpolated chroma samples by applying a 4-tap interpolation filter to actual chroma samples of the reference picture. In general, the number of taps of a filter indicates the number of coefficients required to represent the filter mathematically. A filter with a higher tap number is generally more complex than a filter having a lower tap number.

In instances where video encoder 20 performs bi-prediction on a PU, the PU has two motion vectors. Video encoder 20 may determine, based on the motion vectors of the PU, two reference locations in two reference pictures. Video encoder 20 may then determine, in the manner described above, reference blocks associated with the two reference locations. Video encoder 20 may then determine a prediction block for the PU. Each sample in the prediction block may be a weighted average of corresponding samples in the reference blocks. The weighting of the samples may be based on temporal distances of the reference pictures from the picture containing the PU.

Video encoder 20 may partition a CU into one or more PUs according to various partitioning modes. For instance, if intra prediction is used to generate predictive blocks for the PUs of a CU, the CU may be partitioned according to a PART_2N×2N mode or a PART_N×N mode. In the PART_2N×2N mode, the CU only has one PU. In the PART_N×N mode, the CU has four equally-sized PUs having rectangular prediction blocks. If inter prediction is used to generate predictive blocks for the PUs of a CU, the CU may be partitioned according to the PART_2N×2N mode, the PART_N×N mode, a PART_2N×N mode, a PART_N×2N mode, a PART_2N×nU mode, a PART_2N×uD mode, a PART_nL×2N mode, or a PART_nR×2N mode. In the PART_2N×N mode and the PART_N×2N mode, the CU is partitioned into two equally-sized PUs having rectangular prediction blocks. In each of the PART_2N×nU mode, the PART_2N×uD mode, the PART_nL×2N mode, and the PART_nR×2N mode, the CU is partitioned into two unequally-sized PUs having rectangular prediction blocks.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A TU of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), video encoder 20 may quantize the coefficient block. Quantization generally refers to a process in which transform coefficients are quantized to possibly reduce the amount of data used to represent the transform coefficients, providing further compression. Video encoder 20 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. In some examples, the QP value associated with the CU may be associated with the current picture or slice as a whole. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of video data (i.e., coded pictures and associated data). The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL units may encapsulate different RBSPs for video parameter sets (VPSs), sequence parameter sets (SPSs), picture parameter sets (PPSs), coded slices, SEI, and so on. NAL units that encapsulate RBSPs for video coding data (as opposed to RBSPs for parameter sets and SEI messages) may be referred to as video coding layer (VCL) NAL units.

In HEVC, SPSs may contain information that applies to all slices of a coded video sequence (CVS). In HEVC, a CVS may start from an instantaneous decoding refresh (IDR) picture, or a broken link access (BLA) picture, or a clean random access (CRA) picture that is the first picture in the bitstream, including all subsequent pictures that are not an IDR or BLA picture. That is, in HEVC, a CVS may comprise a sequence of access units that may consist, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A VPS is a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 may signal the motion information of a PU using merge mode or advanced motion vector prediction (AMVP) mode. In other words, in HEVC, there are two modes for the prediction of motion parameters, one being the merge/skip mode and the other being AMVP. Motion prediction may comprise the determination of motion information of a video unit (e.g., a PU) based on motion information of one or more other video units. The motion information (i.e., the motion parameters) of a PU may include motion vector(s) of the PU, reference index(s) of the PU, and one or more prediction direction indicators.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index (i.e., a merging candidate index) that indicates a position within the candidate list of the selected merge candidate.

Video decoder 30 may obtain, from the bitstream, the index into the candidate list (i.e., the merging candidate index). In addition, video decoder 30 may generate the same merge candidate list and may determine, based on the merging candidate index, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion information (e.g., the motion vector) for the current PU. In this way, at the decoder side, once the index is decoded, all motion parameters of the corresponding block where the index points may be inherited by the current PU.

In accordance with various examples, the current block may have dimensions of 2N×2N, where the top-left corner of the current block is denoted by the Cartesian coordinates (x,y). According to these examples, a portion of the above-left neighboring samples is located at or otherwise described by coordinates (x−1, y−1). Similarly, in these examples, a portion of the below-left neighboring samples is located at or otherwise described by coordinates (x−1, y+2N−1). Additionally, in these examples, a portion of the above-right neighboring samples is located at or otherwise described by coordinates (x+2N−1, y−1).

Video encoder 20 may use data associated with one or more of the identified neighboring samples, to derive a depth value for the current block of the dependent depth view. In turn, video encoder 20 may use the derived depth value for the current block, to obtain a disparity vector for the current video block. According to some examples, video encoder 20 may convert the derived depth value to obtain the disparity vector for the current video block. For instance, video encoder 20 may convert the derived depth value using various available data, such as one or more camera parameters associated with a picture containing the current block. In turn, video encoder 20 may associate the obtained disparity vector with the entire current block. For example, where the current block represents a CU in the dependent depth view, video encoder 20 may share the disparity vector across all PUs of the CU.

Video encoder 20 may use the neighboring samples of the current block to derive the disparity vector in various manners, based on particular conditions associated with the neighboring samples. For instance, if the current block is located at a top-left corner of the picture, none of the neighboring samples of the current block may be available. In an example where the current block is located at a boundary of the picture, then only one or two of the three neighboring samples may be available. In an instance where only one neighboring sample is available, video encoder 20 may inherit the depth value for the current block from the one available neighboring sample (i.e., utilize the depth value derived from the one available neighboring sample for the entirety of the current block). In examples where no neighboring samples are available, video encoder 20 may use a co-located block from the base view to predict motion information for the current block in the dependent depth view. More specifically, in an example where no neighboring samples are available for the current block, video encoder 20 may set the disparity vector of the current block as a zero vector. In this and other examples, video encoder may set the depth value associated with the current block to a default depth value. Examples of default depth values that video encoder 20 may use include values of zero (0) or one hundred twenty eight (128).

In examples where video encoder 20 determines that all three neighboring samples are available for the current block in the dependent depth view, video encoder 20 may use the depth values associated with all three neighboring samples to derive the depth value for the current block. In various examples, video encoder 20 may perform a variety of calculations on the depth values associated with the available neighboring samples to derive the depth value for the current block. According to some examples, video encoder 20 may average the depth values associated with the neighboring samples, and use the average as the depth value for the current block. In some instances, video encoder 20 may obtain the average by calculating the mean value of the three depth values, while in other instances, video encoder 20 may select the median and/or mode of the three depth values to obtain the average.

Although described above with respect to examples where all three neighboring samples are available for purposes of discussion, it will be understood that video encoder 20 may implement various techniques of this disclosure in examples where two neighboring samples are available with respect to the current block. Additionally, while described above with respect to a particular set of neighboring samples (i.e., the above-left, above-right, and below-right samples) for the purposes of discussion, video encoder 20 may implement the techniques of this disclosure to use various combinations of samples, including neighboring samples and/or samples that do not neighbor the current block. In various examples, video encoder 20 may prioritize various available samples in selecting the particular set of samples to be used in deriving the reconstructed depth value for the current block.

According to various examples, video encoder 20 may implement a "weighted average" approach to derive the depth value of the current block from the depth values associated with the three neighboring samples. More specifically, video encoder 20 may respectively assign a weight to each depth value of each neighboring sample, and multiply each depth value by the assigned weight to obtain three weighted product values. In turn, video encoder 20 may sum the three product values, and divide the sum by a predetermined constant (e.g., 16) to obtain a resulting value. Video encoder 20 may use the resulting value as the depth value for the current block.

In some implementations of the weighted average approach, video encoder 20 may assign each neighboring sample the following relative weights: (5/16) to the above-left sample, (5/16) to the below-left sample, and (6/16) to the above-right sample. According to these implementations, video encoder 20 may calculate the weighted average of the depth values by applying the following formula: $[(P_0*5)+(P_1*5)+(P_2*6)]/16$. In the described formula, $P_0$, $P_1$, and $P_2$ denote the depth values of the above-left, below-left, and above-right samples, respectively. Additionally, in the described formula, video encoder 20 uses the predetermined constant of 16, by which to divide the sum of the weighted products. In some examples, video encoder 20 may add an offset value to the sum of the three product values. For instance, the offset may be a predetermined value, such as a selected constant, or an output of another formula executed by video encoder 20. In one example, video encoder 20 may set the offset value to a value of eight (8). In this example, video encoder 20 may calculate the weighted average of the depth values by applying the following formula: $[(P_0*5)+(P_1*5)+(P_2*6)+8]/16$. Although specific values are described above with respect to the weights, the offset, and the predetermined constant (the divisor of the formula), it will be appreciated that in various implementations, video encoder 20 may assign different values to the weights, the offset, and/or the predetermined constant used in the weighted average calculation of this disclosure.

Video encoder 20 may use the resulting value, as applied to specific values of $P_0$, $P_1$, and $P_2$, with the predetermined offset, as the depth value of the current block in dependent depth view. In turn, video encoder 20 may convert the depth value associated with the current block, as calculated from the described formula and optionally inclusive of an offset, to derive the disparity vector for the current block. As described above, video encoder 20 may use data such as camera parameters to convert the derived depth value to the disparity vector, and where the video block represents a CU, video encoder 20 may apply the derived disparity vector to all PUs of the CU. The depth value derived for the current block according to any of the techniques described herein may also be referred to in this disclosure as a "reconstructed depth value."

According to aspects of this disclosure, video encoder 20 may, in turn, use the disparity vector derived by the techniques above, to derive motion information for the current block in the dependent depth view, based on a reference layer view or a base view of the current picture. In various examples, video encoder 20 may derive an inter-view predicted motion vector candidate (IPMVC) for the current block of the dependent depth view, based on the reference view. In some examples, video encoder 20 may obtain an inter-view disparity motion vector candidate (IDMVC) associated with the current block of the dependent depth view. To obtain the IDMVC, video encoder 20 may use the disparity vector, which is derived according to the techniques described above. More specifically, video encoder 20 may convert the disparity vector into a disparity motion vector to derive the IDMVC. For instance, video encoder 20 may apply one or more camera parameters in converting the disparity vector into the disparity motion vector. The IDMVC may point to a block of video data in the base depth view. To obtain the IPMVC, video encoder 20 may derive the IPMVC from motion information associated with a corresponding block in the base view. In one example, video encoder 20 may derive the IPMVC by copying the motion information of the corresponding block in the base view. In various instances of IPMVC derivation, the motion information from the base view may be either spatial or temporal. By obtaining the IPMVC and/or the IDMVC, video encoder 20 may implement the techniques of this disclosure to increase the number of motion vector candidates for the current block of the dependent depth view, potentially improving accuracy of motion vector prediction for the current block.

Additionally, video encoder 20 may implement techniques of this disclosure to insert the IPMVC and the IDMVC into a merge list associated with the current block in the dependent depth view. In some examples, video encoder 20 may position a motion vector inheritance (MVI) candidate in a first position (e.g., a position having the highest priority or a position associated with the highest likelihood of utilization or a position having the lowest index value) in the merge list. Video encoder 20 may position the IPMVC immediately after the MVI candidate (i.e., at a position having a higher index value relative to the MVI candidate), such as at a second position in the merge list. Additionally, Video encoder 20 may position the IDMVC immediately after the IPMVC, and immediately before a first spatial motion vector candidate in the merge list. Video encoder 20 may position multiple spatial motion vector candidates after the IDMVC. By constructing the merge list in the order described above, to include the IPMVC and IDMVC in the described positions, video encoder 20 may implement the techniques of this disclosure to improve depth-oriented motion vector prediction accuracy by increasing the number of inter-view motion vector candidates from the base view, and ordering the candidates to more likely reflect a most-to-least likely distribution, thereby potentially reducing encoding bit overhead. Other orders (or prioritizations) of the candidates within the merge list in accordance with the techniques are described at other portions of this disclosure.

As described thus far, the techniques of this disclosure are generally directed to video encoder 20 generating two inter-view motion vector candidates (namely, the IPMVC and the IDMVC) using the base view and, provided that both candidates are available, adding both candidates to a merge list associated with the current block in the dependent depth view. In accordance with various aspects of this disclosure, which video encoder 20 may derive an IPMVC from the base view, and, based on various conditions, may add the IPMVC derived from the base view to the merge list. As one example, video encoder 20 may shift the derived disparity vector spatially (e.g., by various offsets), and use the shifted disparity vector to obtain the shifted IPMVC. For instance, video encoder 20 may use the shifted disparity vector to locate a corresponding block in the base view. For the base view block that video encoder 20 identifies in this manner and successfully locates, video encoder 20 may add the corresponding shifted IPMVC associated with the corresponding base view block to a selection pool. The IPMVC derived using the shifted disparity vector is referred to herein as a "shifted IPMVC."

In one example, to shift the disparity vector in locating the corresponding base view blocks, video encoder 20 may apply a horizontal offset denoted by '$M_1$' and a vertical offset denoted by '$M_2$' to the disparity vector. According to this example, video encoder 20 may obtain the value of $M_1$ by applying the formula (((Width/2)*4)+4), and the value of $M_2$ by applying the formula (((Height/2)*4)+4). In the above examples, where the current block from the dependent depth view is a CU, the values "Width" and "Height" denote, respectively, the horizontal and vertical dimensions of a current PU of the CU. While specific formulas are described above with respect to deriving $M_1$ and $M_2$, it will be understood that video encoder 20 may derive $M_1$ and $M_2$ using other techniques, as well.

In some instances, video encoder 20 may determine that no shifted IPMVC is available. For example, video encoder 20 may determine that no shifted IPMVC is available, if the base view block identified by the shifted disparity vector is intra-coded or intra-predicted. In such instances where video encoder 20 determines that no shifted IPMVC is available, video encoder 20 may use one or more disparity motion vectors (DMVs) to generate motion vector candidates with which to populate a merge list in accordance with aspects of this disclosure. For instance, video encoder 20 may select a DMV associated with a spatial neighboring block of the current block in the dependent depth view and shift the selected DMV by a predetermined offset to obtain a disparity shifted motion vector (DSMV) candidate.

For instance, video encoder 20 may survey a set of reference picture lists associated with the spatial neighboring blocks. More specifically, each of the spatial neighboring blocks described above may contain a RefPicList0 and a RefPicList1. Video encoder 20 may survey the respective RefPicList0 for each of the spatial neighboring blocks described above, to determine whether any of the surveyed RefPicList0 instances contains a disparity motion vector (DMV). If video encoder 20 detects a DMV in one of the RefPicList0 instances surveyed, video encoder 20 may select a DMV available from the surveyed RefPicList0 instances. For example, video encoder 20 may select the first available DMV that video encoder 20 detects from the surveyed RefPicList0 instances. In turn, video encoder 20 may shift a horizontal offset of the selected DMV, to obtain the DSMV candidate. Additionally, in generating the DSMV candidate, video encoder 20 may copy or "inherit" reference indices from the selected DMV. For instance, where the DSMV candidate is denoted by MvC and the selected DMV is denoted by mv[0], video encoder 20 may derive the DSMV candidate using the following formulas: MvC[0]=mv[0], MvC[1]=mv[1] and MvC[0][0]+=N, where 'N' is a predetermined constant (or "fixed" value). Example values of N that video encoder 20 may use include 4, 8, 16, 32, 64, −4, −8, −16, −32, −64.

In some examples, video encoder 20 may not locate any DMVs associated with the spatial neighboring blocks of the dependent depth view when searching or surveying the RefPicList0 instances associated with the spatial neighboring blocks. In these examples, video encoder 20 may not derive a DSMV using the DMVs associated with spatial neighboring blocks in the dependent depth view. Instead, if video encoder 20 determines that no DMV candidate is available within any of the corresponding RefPicList0 instances, video encoder 20 may implement alternate techniques of this disclosure to obtain the DSMV candidate for insertion into the merge list.

For example, if video encoder 20 does not locate any DMVs associated with spatial neighboring candidates in any of the RefPicList0 instances that correspond to the spatial neighboring candidates, video encoder 20 may derive the DSMV candidate by shifting the disparity vector calculated for the current block. More specifically, video encoder 20 may add an offset to the disparity vector, and use the resulting shifted disparity vector as the DSMV candidate. Where the disparity vector is denoted by DV, video encoder 20 may derive the DSMV using the following formula: MvC[0]=DV and MvC[0][0]+=N; MvC[0][1]=0 and MvC [1]=DV and MvC[1][0]+=N; MvC[1][1]=0. Video encoder 20 may assign various values to N, such as 4, 8, 16, 32, 64, −4, −8, −16, −32, or −64. Additionally, video encoder 20 may set a reference index corresponding to MvC[X] to the reference index of a picture in RefPicListX (where X denotes a value other than 0) that belongs to the base view.

According to the various techniques described thus far, video encoder 20 may apply inter-view motion prediction across depth views to derive three additional motion vector candidates for the current block in the dependent depth view. Namely, video encoder 20 may derive the IPMVC, the IDMVC, and the shifted IPMVC/DSMV candidates for the current block in the dependent depth view, by applying inter-view motion vector prediction across depth views. By implementing one or more techniques described herein, video encoder 20 may improve accuracy of motion vector prediction for dependent depth views by generating a greater number of motion vector candidates than the number of motion vector candidates generated according to conventional processes. In various examples, video encoder 20 may generate a greater number of motion vector candidates, by leveraging motion information from a depth base view, which may be coded prior to one or more dependent depth views being coded. In this manner, video encoder 20 may implement the techniques of this disclosure to improve accuracy and/or robustness by generating an increased number of motion vector candidates using already-coded motion information from the depth base view.

In turn, video encoder 20 may implement techniques of this disclosure to construct a merge list that potentially includes one or more of the IPMVC, the IDMVC and/or the shifted IPMVC/DSMV, obtained as described above. To mitigate or eliminate redundancy among motion vector candidates included in the merge list, video encoder 20 may implement a process referred to herein as "pruning" As described herein, pruning may refer to one or more techniques by which video encoder 20 may check whether multiple merge list candidates are identical, and in turn, may discard one or more of the identical candidates, to reduce redundancy within the merge list. As part of the pruning process, video encoder 20 may compare the motion vectors and reference indices of two or more merge list candidates against one another prior to insertion into the merge list, and eliminate one or more of the merge list candidates if the merge list candidates are identical to one another. In specific examples, video encoder 20 may compare the following corresponding characteristics of each two merge list candidates: the motion vector, reference index $L_0$, and reference index $L_1$.

According to the techniques of this disclosure, video encoder 20 may perform a constrained pruning process. For example, video encoder 20 may implement the constrained pruning process of this disclosure to compare the IPMVC to the motion vector inheritance (MVI) candidate. If the IPMVC is identical to the MVI candidate, video encoder 20 may discard the IPMVC from selection for inserting into the merge list. In this and other examples, video encoder 20 may implement the constrained pruning to compare the IDMVC to each of the spatial merging candidates generated with respect to the merge list. Similarly, video encoder 20 may discard the IDMVC from selection for the merge list if the IDMVC matches (i.e. is identical to) any of the spatial merging candidates. Additionally, video encoder 20 may compare the shifted IPMVC, if the shifted IPMVC was generated, against the IPMVC and may discard the shifted IPMVC.

Alternatively, if the shifted IPMVC was not generated, as described above, video encoder 20 may have access to the DSMV candidate. In this example, video encoder 20 may insert the DSMV into the merge list without comparing the DSMV against any other candidates for pruning purposes. In instances where the shifted IPMVC was available, but was discarded based on pruning against the IPMVC, video encoder 20 may not insert any candidate in the last position of the merge list. In this manner, video encoder 20 may implement the constrained pruning process to construct a merge list that includes additional motion vector candidates generated using depth-oriented inter-view motion prediction as described herein.

An example merge list order as constructed by video encoder 20, prefixed by index values for each candidate, is as follows:

0. MVI candidate
1. IPMVC, as generated by the techniques described herein, and if not discarded via pruning against the MVI candidate
2. IDMVC, as generated by the techniques described herein, and if not discarded via pruning against either spatial candidate A1 or spatial candidate B1
3. Spatial candidate A0
4. Spatial candidate B2
5. Shifted IPMVC, as generated by the techniques described herein (if available and not discarded via pruning against IPMVC), or DSMV (if shifted IPMVC was unavailable), or no candidate (e.g., if Shifted IPMVC was available, but was discarded via pruning against IPMVC).

In the example merge list described above, the index values indicate relative positions of corresponding candidates. According to one example perspective, index value 0 corresponds to an initial position within the merge list, with index value 1 corresponding to a second position in the merge list, and so on, with index value 5 corresponding to a last position within the merge list. Additionally, video encoder 20 may construct the merge list to position the most likely candidate (e.g., the candidate with the highest probability of being selected) at index 0. More specifically, video encoder 20 may position the candidates in decreasing order of likelihood of being selected, corresponding to positions from index 0 to index 5. In this manner, video encoder 20 may reduce bit overhead during signaling, based on 0 and 1 values requiring only a single bit, to be represented as binary numbers.

Additionally, video encoder 20 may select one of the motion vector candidates from the merge list, with which to encode motion information for the current block. In turn, video encoder 20 may signal the index of the selected motion vector candidate to video decoder 30. Video decoder 30 may implement one or more of the techniques described above with respect to video encoder 20, to generate one or more depth-oriented inter-view motion vector candidates. Video decoder 30 may implement one or more techniques of this disclosure to reconstruct at least a portion of the merge list that potentially includes one or more of the depth-oriented inter-view motion vector candidates, and may use the index signaled by video encoder 20 to select the same motion vector candidate for decoding purposes. More specifically, by selecting the motion vector candidate associated with the index signaled by video encoder 20, video decoder 30 may decode the current block in the dependent depth view using depth-oriented inter-view motion information, thereby improving accuracy and robustness of the motion information of the current block, in accordance with one or more aspects of this disclosure.

As described herein, one or both of video encoder 20 or video decoder 30 may represent, include, be, or be part of a device for coding video data, the device including a memory and one or more processors. The one or more processors may be configured or otherwise operable to determine a depth value associated with a block of video data included in a dependent depth view, based on one or more neighboring pixels positioned adjacent to the block of video data in the dependent depth view, and generate a disparity vector associated with the block of video data, based at least in part on the determined depth value associated with the block of video data. The one or more processors may further be configured or operable to use the disparity vector to generate an inter-view disparity motion vector candidate (IDMVC), generate an inter-view predicted motion vector candidate (IPMVC) associated with the block of video data based on a corresponding block of video data in a base view, and determine whether to add any of the IDMVC and the IPMVC to a merge candidate list associated with the block of video data. In various examples, to determine whether to add any of the IDMVC or the IPMVC to the merge candidate list, the one or more processors may be configured or operable to determine whether to add one, both, or neither of the IDMVC or the IPMVC to the merge candidate list. In some examples, to determine the depth value, the one or more processors are configured to calculate a weighted average of values associated with the one or more neighboring pixels. According to some examples, the one or more neighboring pixels include an above-left pixel, an above-right pixel, and a below-right pixel with respect to the block of video data. In some examples, to calculate the weighted average, the one or more processors are configured to apply weights of five (5), six (6), and five (5) to the above-left pixel, an above-right pixel, and a below-right pixel, respectively, to obtain a plurality of weighted values.

According to various examples, to calculate the weighted average, the one or more processors are configured to obtain a sum based on the plurality of weighted values, and obtain an offset sum based on an offset value and the sum. In some examples, to calculate the weighted average, the one or more processors are configured to divide the offset sum by a predetermined value. In some examples, the offset value comprises a value of eight (8), and the predetermined value comprises a value of sixteen (16). In some examples, to determine the depth value, the one or more processors are configured to calculate at least one of a mean value, a median value, or a mode value associated with the one or more neighboring pixels. According to some examples, the block of video data is a coding unit (CU), and the generated disparity vector applies to all prediction units (PUs) included in the CU.

In various examples, to generate the IPMVC, the one or more processors are configured to derive the IPMVC from the base view of the block of video data. According to some examples, the one or more processors are further configured to shift the disparity vector spatially to form a shifted disparity vector, and use the shifted disparity vector to locate a corresponding block of video data in the base view. In some examples, the one or more processors are further configured to determine whether a shifted IPMVC is available from the located corresponding block of video data in the base view, and based on a determination that the shifted IPMVC is available, to determine whether to add the shifted IPMVC to the merge list.

According to some examples, each of one or more spatial neighboring blocks of the current block is associated with a respective reference picture list 0 and a respective reference picture list 1. In some such examples, the one or more processors are further configured to determine that the shifted IPMVC is not available from the base view, and to determine whether at least one respective reference picture list 0 associated with the spatial neighboring blocks contains a disparity motion vector. In some such examples, the one or more processors are configured to, based on a determination that the at least one respective reference picture list 0 associated with the spatial neighboring blocks contains the disparity motion vector, shift a horizontal component of the disparity motion vector contained in the respective reference picture list 0 to form a disparity shifted motion vector (DSMV) candidate. In one such example, the one or more processors are configured to add the DSMV candidate to the merge list.

In some examples, the one or more processors are further configured to determine that none of the respective reference picture lists 0 contains the disparity motion vector, apply an offset value to the disparity vector to form the DSMV candidate, and apply the DSMV candidate to the merge list. According to some examples, to determine the depth value, the one or more processors are configured to determine that the one or more neighboring pixels include only one available neighboring pixel, and inherit a depth value of the one available neighboring pixel to form the depth value of the block of video data. In some examples, the one or more processors are further configured to determine that none of the one or more neighboring pixels is available, and, to generate the disparity vector, the one or more processors are configured to at least one of set the disparity vector to a zero vector or set the depth value associated with the block of video data to a default depth value.

One or both of video encoder 20 and/or video decoder 30 may represent, include, be, or be part of a device for coding video data, the device including a memory; and one or more processors. The one or more processors may be configured or otherwise operable to compare an inter-view predicted motion vector candidate (IPMVC) to a motion vector inheritance (MVI) candidate, where the IPMVC and the MVI candidate are each associated with a block of video data in a dependent depth view, and where the IPMVC is generated from a corresponding block of video data in a base depth view. The one or more processors may be further configured or operable to perform one of adding the IPMVC to a merge candidate list based on the IPMVC being different from the MVI candidate, or omitting the IPMVC from the merge candidate list based on the IPMVC being identical to the MVI candidate. In some examples, to add the IPMVC to the merge list, the one or more processors are further configured to perform one of inserting the IPMVC at an initial position within the merge candidate list based on the MVI candidate being unavailable for addition to the merge candidate list, or inserting the IPMVC at a position within the merge candidate list that follows a position of the MVI candidate within the merge candidate list based on the MVI candidate being available for addition to the merge candidate list. In various examples, the initial position is associated with an index value of zero (0).

According to some examples, to compare the IPMVC to the MVI candidate, the one or more processors are configured to compare motion information associated with the IPMVC to corresponding motion information associated with the MVI candidate, and compare at least one reference index associated with the IPMVC to at least one corresponding reference index associated with the MVI candidate. In some examples, the one or more processors are further configured or operable to compare an inter-view disparity motion vector candidate (IDMVC) to an available one or more of a first spatial candidate associated with the merge candidate list and a second spatial candidate associated with the merge candidate list, where each of the IDMVC, the first spatial candidate, and the second spatial candidate is associated with the block of video data in the dependent depth view, and where the IDMVC is generated from a disparity vector associated with the block of video data. According to some such examples, the one or more processors are configured or otherwise operable to perform one of adding the IDMVC to the merge candidate list based on the IDMVC being different from each of the available one or more of the first spatial candidate and the second spatial candidate, or omitting the IDMVC from the merge candidate list based on the IDMVC being identical to at least one of the first spatial candidate or the second spatial candidate.

In some examples, to add the IDMVC to the merge candidate list, the one or more processors are configured or operable to insert the IDMVC at a next available position within the merge candidate list. In some such examples, to insert the IDMVC at the next available position within the merge candidate list, the one or more processors are configured or operable to insert the IDMVC at a position that follows a position of at least one of the first spatial candidate or a position of the second spatial candidate. According to some examples, the one or more processors are further configured or operable to determine that a shifted IPMVC is available, where the shifted IPMVC is associated with the block of video data in the dependent depth view, and where the shifted IPMVC is generated from the corresponding block of video data in the base depth view. In some such examples, the one or more processors are further configured or operable to compare the shifted IPMVC to the IPMVC.

According to some examples, the one or more processors are further configured to perform one of adding the shifted IPMVC to the merge candidate list based on the shifted IPMVC being different from the IPMVC and the merge candidate list including less than six (6) candidates, or omitting the shifted IPMVC from the merge candidate list based on the shifted IPMVC being identical to the IPMVC. In some examples, the one or more processors are further configured to determine that a disparity shifted motion vector (DSMV) candidate is available, where the DSMV candidate is associated with the block of video data in the dependent depth view, and where the DSMV candidate is generated using one or more spatial neighboring blocks associated with the block of video data in the dependent depth view. According to some examples, the one or more processors are further configured or operable to add the DSMV candidate to the merge candidate list, based on the merge candidate list including less than six (6) candidates.

In some examples, to add the DSMV candidate to the merge candidate list, the one or more processors are configured to insert the DSMV candidate at a position that: 1) follows a position of a spatial candidate included in the merge candidate list, and 2) precedes a position of a temporal candidate included in the merge candidate list. According to some examples, to determine that the DSMV candidate is available, the one or more processors are configured or operable to determine that the DSMV candidate is available responsive to determining that a shifted IPMVC is not available, where the shifted IPMVC is associated with the block of video data in the dependent depth view, and where the shifted IPMVC is generated from the base view of the block of video data.

According to some examples, the DSMV candidate includes a disparity motion vector (DMV) selected from a reference picture list 0 (RefPicList0) associated with at least one spatial neighboring sample of the one or more spatial neighboring samples. In some examples, the DSMV candidate is generated based on a shifting of a disparity vector associated with the block of video data in the dependent depth view, and the disparity vector is generated from one or more depth values associated with the one or more spatial neighboring blocks associated with the block of video data in the dependent depth view.

Figure 2:
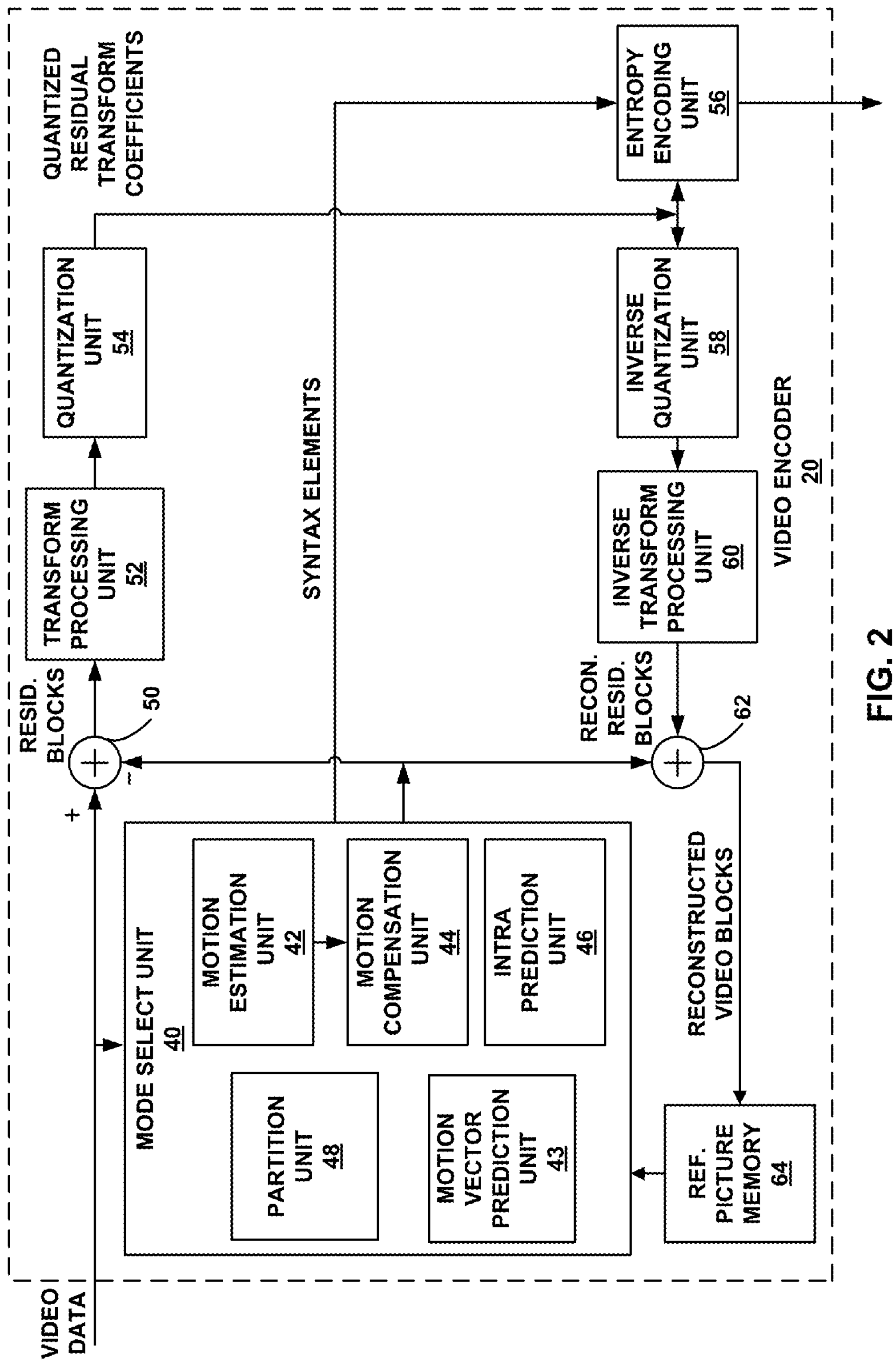
FIG. 2 is a block diagram illustrating an example of a video encoder that may implement or otherwise utilize techniques for depth oriented inter-view motion vector prediction in video coding.

FIG. 2 is a block diagram illustrating an example of video encoder 20 that may implement or otherwise utilize techniques for depth oriented inter-view motion vector prediction in video coding. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Multiview Video Coding

Multiview video coding (MVC) is an extension of H.264/AVC. The MVC specification is briefly discussed in the sections and sub-sections of this disclosure below.

MVC Bitstream Structure

Figure 4:
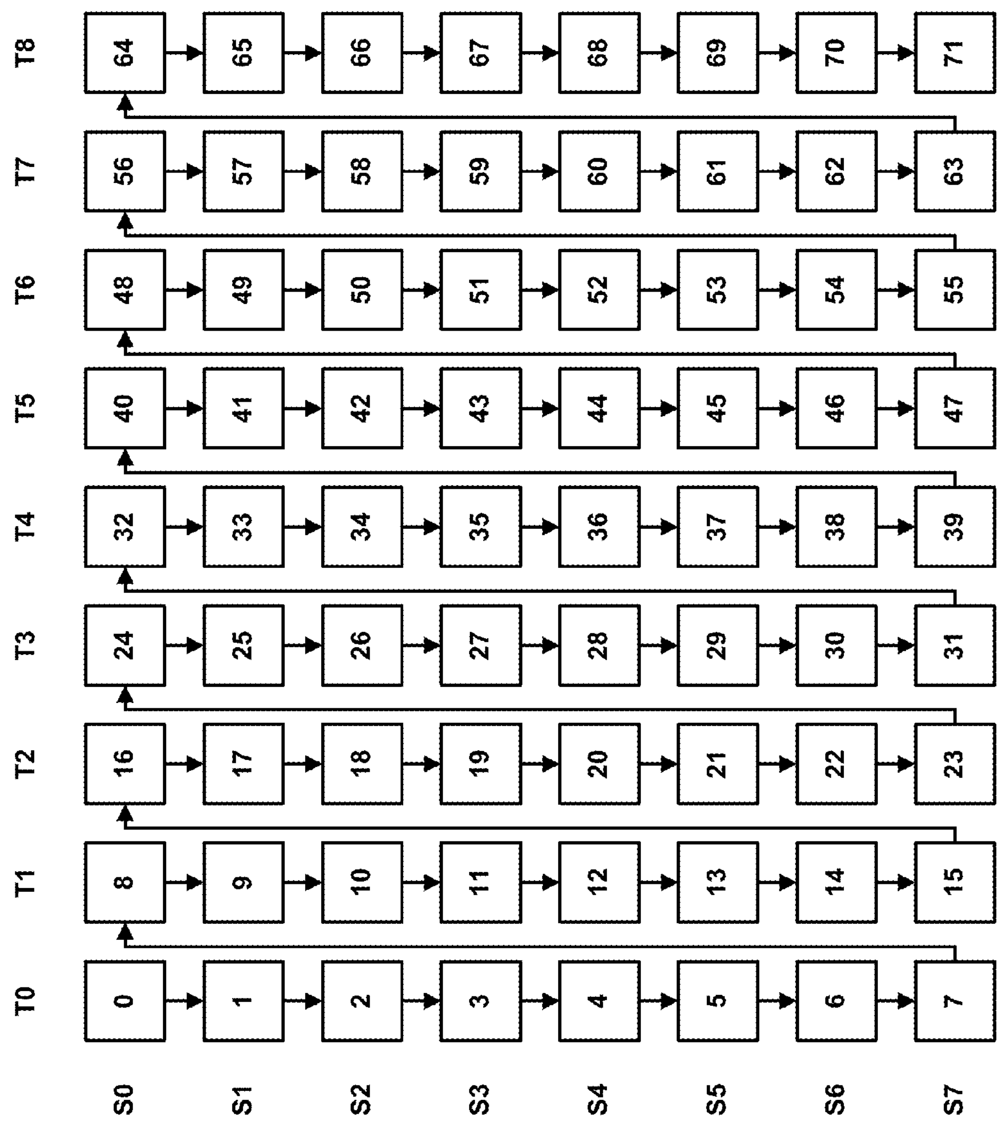
FIG. 4 is a conceptual diagram illustrating an example multi-view decoding order.

A typical MVC decoding order (i.e. bitstream order) is shown in FIG. 4. The decoding order arrangement is referred to as time-first coding. Each access unit (AU) is defined to contain the coded pictures of all the views for one output time instance. Note that the decoding order of access units may not be identical to the output or display order.

MVC Coding Structure

Figure 5:
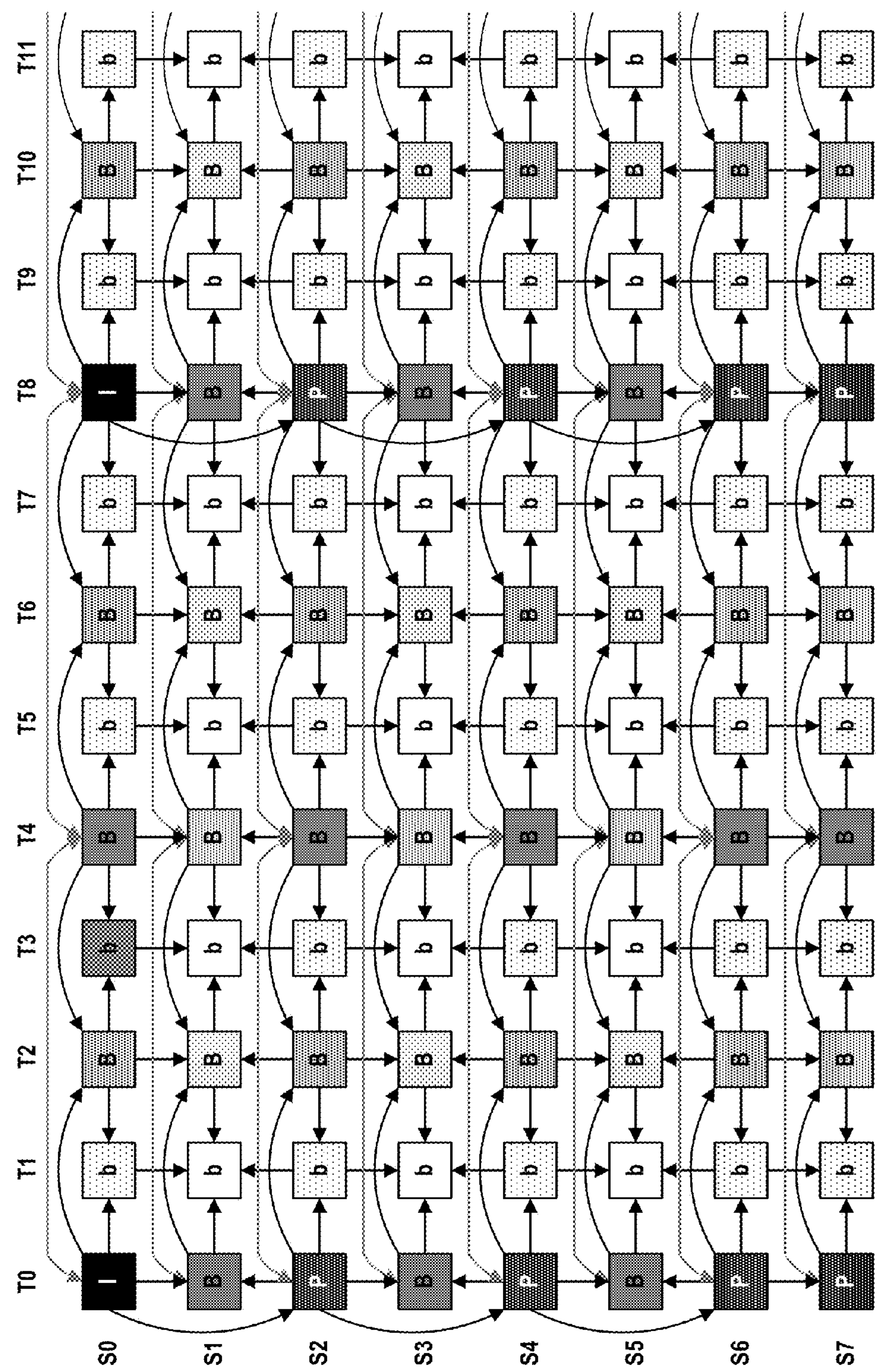
FIG. 5 is a conceptual diagram illustrating an example MVC prediction pattern that may be used with MVC, multi-view HEVC, and 3D-HEVC (multi-view plus depth).

A typical MVC prediction (including both inter-picture prediction within each view, and inter-view prediction) structure for multi-view video coding is shown in FIG. 5, where predictions are indicated by arrows, the pointed-to object using the pointed-from object for prediction reference.

In MVC, the inter-view prediction is supported by disparity motion compensation, which uses the syntax of the H.264/AVC motion compensation, but allows a picture in a different view to be used as a reference picture.

Coding of two views could be supported also by MVC, and one of the advantages of MVC is that an MVC encoder could take more than two views as a 3D video input and an MVC decoder can decode such a multiview representation. So any renderer with an MVC decoder may expect 3D video contents with more than two views.

MVC Inter-View Prediction

In MVC, inter-view prediction is allowed among pictures in the same access unit (i.e., with the same time instance). When coding a picture in one of the non-base views, a picture may be added into a reference picture list, if the picture potentially being added is in a different view but with a same time instance.

An inter-view reference picture can be put in any position of a reference picture list, just like any inter-prediction reference picture. When an inter-view reference picture is used for motion compensation, the corresponding motion vector is referred to as a 'Disparity Motion Vector.'

HEVC Techniques

Some relevant HEVC techniques are reviewed below.

Reference Picture List Construction

Typically, a reference picture list construction for the first or the second reference picture list of a B picture includes two steps: reference picture list initialization and reference picture list reordering (or "modification"). The reference picture list initialization is an explicit mechanism that puts the reference pictures in the reference picture memory (also known as a "decoded picture buffer") into a list based on the order of a picture order count (POC) value, that is aligned with display order of the corresponding picture. The reference picture list reordering mechanism can modify the position of a picture that was put in the list during the reference picture list initialization to any new position, or put any reference picture in the reference picture memory in any position, even if the picture does not belong to the initialized list. Some pictures after the reference picture list reordering (modification) may be put in a much farther position in the list. However, if a position of a picture exceeds the number of active reference pictures of the list, the picture is not considered as an entry of the final reference picture list. The number of active reference pictures of may be signaled in the slice header for each list.

After reference picture lists are constructed (namely RefPicList0 and RefPicList1 if available), a reference index to a reference picture list can be used to identify any reference picture included in the reference picture list.

Temporal Motion Vector Predictor (TMVP)

To get a Temporal Motion Vector Predictor (TMVP), first, a co-located picture is to be identified. If the current picture is a B slice, a collocated_from_l0_flag is signaled in a slice header to indicate whether the co-located picture is from RefPicList0 or RefPicList1.

After a reference picture list is identified, collocated_ref_idx, signaled in a slice header, is used to identify the picture in the list.

A co-located prediction unit (PU) is then identified by checking the co-located picture. Either the motion of the right-bottom PU of the coding unit (CU) containing the current PU, or the motion of the right-bottom PU within the center PUs of the CU containing the current PU is used.

When motion vectors identified by the above process are used to generate a motion candidate for AMVP or merge mode, the motion vectors may need to be scaled based on the temporal location (reflected by POC value of the corresponding picture).

Note the target reference index of all possible reference picture lists for the temporal merging candidate derived from TMVP is always set to 0 while for AMVP, the target reference index is set equal to the decoded reference index.

In HEVC, the SPS includes a flag sps_temporal_mvp_enable_flag and the slice header includes a flag pic_temporal_mvp_enable_flag when sps_temporal_mvp_enable_flag is equal to 1. When both pic_temporal_mvp_enable_flag and temporal_id are equal to 0 for a particular picture, no motion vector from pictures before that particular picture in decoding order would be used as a temporal motion vector predictor in decoding of the particular picture or a picture after the particular picture in decoding order.

HEVC Based 3DV

Currently, a Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For MV-HEVC, it should be guaranteed that there are only high-level syntax (HLS) changes in it, such that no module in the CU/PU level in HEVC needs to be re-designed and can be fully reused for MV-HEVC. For 3D-HEVC, new coding tools, including those in coding unit/prediction unit level, for both texture and depth views may be included and supported. The latest software 3D-HTM for 3D-HEVC can be downloaded from the following link: [3D-HTM version 7.0]: https://hevc.hhi.fraunhofer.de/svn/svn_3DVCSoftware/tags/HTM-7.0/ The latest reference software description as well as the working draft of 3D-HEVC is to be available as follows: Gerhard Tech, Krzysztof Wegner, Ying Chen, Sehoon Yea, "3D-HEVC Test Model 4," JCT3V-D1005_spec_v1, Joint Collaborative Team on 3D Video Coding Extension Development of ITU-T SG 16 WP 3 and ISO/IEC JTC 1/SC 29/WG 11, 4th Meeting: Incheon, KR, 20-26 Apr. 2013. The working draft is available for download from the following link: http://phenix.it-sudparis.eu/jct2/doc_end_user/documents/4_Incheon/wg11/JCT3V-D1005-v1.zip To further improve the coding efficiency, two new technologies, namely, "inter-view motion prediction" and "inter-view residual prediction" have been adopted in the latest reference software. To enable these two coding tools, the first step is to derive a disparity vector. A video coding device may either use the disparity vector to locate the corresponding block in the other view for inter-view motion/residual prediction, or may convert the disparity vector to a disparity motion vector for inter-view motion prediction.

Implicit Disparity Vector

A video coding device may generate an implicit disparity vector (IDV) when a PU employs inter-view motion vector prediction, i.e., the candidate for AMVP or merge modes is derived from a corresponding block in the other view with the help of a disparity vector. Such a disparity vector is called an IDV. An IDV is stored to the PU for the purpose of disparity vector derivation.

Disparity Vector Derivation Process

To derive a disparity vector, a video coding device may use a technique called Neighboring Blocks based Disparity Vector (NBDV), as described in the current 3D-HTM. NBDV utilizes disparity motion vectors from spatial and temporal neighboring blocks. According to NBDV, the video coding device may check motion vectors of spatial or temporal neighboring blocks in a fixed checking order. Once a disparity motion vector or an IDV is identified, the checking process is terminated and the identified disparity motion vector is returned and converted to the disparity vector which will be used in inter-view motion prediction and inter-view residue prediction. If no such disparity vector is found after checking all the pre-defined neighboring blocks, the video coding device may use a zero disparity vector for the inter-view motion prediction while inter-view residual prediction will be disabled for the corresponding prediction unit (PU).

The spatial and temporal neighboring blocks used for NBDV are introduced in the following part of this disclosure, followed by the checking order.

Spatial Neighboring Blocks

Five spatial neighboring blocks are used for the disparity vector derivation. The five spatial neighboring blocks used are: the below-left, left, above-right, above and above-left blocks of a current prediction unit (PU), denoted by A0, A1, B0, B1 or B2, as defined in FIG. 8-3 of the HEVC specification.

Temporal Neighboring Blocks

Up to two reference pictures from a current view, the co-located picture, and the random-access picture or the reference picture with the smallest POC difference and smallest temporal ID are considered for temporal block checks. Random-access is first checked, followed by the co-located picture. For each candidate picture, two candidate blocks are checked, as listed below:

a) Center block (CR): The center 4×4 block of the co-located region of the current PU, see 'Pos. A' (102) in FIG. 6.

b) Bottom Right block (BR): Bottom-right 4×4 block of the co-located region of the current PU, see 'Pos. B' (104) in FIG. 6.

Checking Order

Whether DMVs are used is checked first for all the spatial/temporal neighboring blocks, followed by IDVs. Spatial neighboring blocks are checked first, followed by temporal neighboring blocks.

- Five spatial neighboring blocks are checked in the order of A1, B1, B0, A0 and B2. If one of the five checked spatial neighboring blocks uses DMV, video encoder 20 may terminate the checking process and may use the corresponding DMV as the final disparity vector.
- For each candidate picture, the two blocks are checked in order, CR and BR for the first non-base view or BR, CR for the second non-base view. If one of the two checked blocks uses DMV, video encoder 20 may terminate the checking process, and may use the corresponding DMV as the final disparity vector.
- Five spatial neighboring blocks are checked in the order of A0, A1, B0, B1 and B2. If one of the five checked spatial neighboring blocks uses IDV and is coded as skip/merge mode, the checking process is terminated and the corresponding IDV will be used as the final disparity vector.

Refining the Disparity Vector

The disparity vector, generated from the NBDV scheme could be further refined using information in the coded depth map. That is, the accuracy of the disparity vector could be enhanced by taking benefit of the information in the coded base view depth map. The refinement steps may be described as follows:

1. Locate a corresponding depth block by the derived disparity vector in the previously coded reference depth view, such as the base view; the size of the corresponding depth block is the same as that of current PU.
2. A disparity vector is calculated from the collocated depth block, from the maximum value of the four corner depth values. This is set equal to the horizontal component of a disparity vector, while the vertical component of the disparity vector is set to 0.

This new disparity vector is called a "depth oriented neighboring block based disparity vector" (DoNBDV). The disparity vector from the NBDV scheme is then replaced by this newly derived disparity vector from the DoNBDV scheme for inter-view candidate derivation for the AMVP and merge modes. Note that the unrefined disparity vector is used for inter-view residual prediction. In addition, the refined disparity vector is stored as the motion vector of one PU if the refined disparity vector is coded with backward VSP mode.

Block-Based View Synthesis Prediction Using Neighboring Blocks in 3D-HEVC

The backward-warping VSP approach as proposed in JCT3V-C0152 was adopted in the 3rd JCT-3V meeting. A basic idea of this backward-warping VSP is the same as the block-based VSP in 3D-AVC. Both of these two techniques use the backward-warping and block-based VSP to avoid transmitting the motion vector differences and use more precise motion vectors. Implementation details are different, due to different platforms.

In the following paragraphs, the term "BVSP" is used to indicate the backward-warping VSP approach in 3D-HEVC.

In 3D-HTM, texture first coding is applied in common test conditions. Therefore, the corresponding non-base depth view is unavailable when decoding one non-base texture view. Therefore, the depth information is estimated and used to perform BVSP.

In order to estimate the depth information for a block, it is proposed to first derive a disparity vector from the neighboring blocks, and then use the derived disparity vector to obtain a depth block from a reference view.

In HTM 5.1 test model, there exists a process to derive a disparity vector predictor, known as NBDV (Neighboring Block Disparity Vector). Let (dvx, dvy) denote the disparity vector identified from the NBDV function, and the current block position is (blockx, blocky). It is proposed to fetch a depth block at (blockx+dvx, blocky+dvy) in the depth image of the reference view. The fetched depth block would have the same size of the current prediction unit (PU), and the fetched depth block will then be used to do backward warping for the current PU. FIG. 4 illuminates the three steps of how a depth block from the reference view is located and then used for BVSP prediction.

Changes to NBDV

If BVSP is enabled in the sequence, the NBDV process for inter-view motion prediction is changed as described in the following paragraphs and bullets:

- For each of the temporal neighboring blocks, if the temporal neighboring block uses a disparity motion vector, the disparity motion vector is returned as the disparity vector and the disparity vector is further refined with the method described above with respect to "refining the disparity vector."
- For each of the spatial neighboring blocks, the following apply:
  - For each reference picture list 0 or reference picture list 1, the following apply:
    - If the reference picture list (e.g., 0 or 1) uses a disparity motion vector, the disparity motion vector is returned as the disparity vector and the disparity motion vector is further refined with the method described above with respect to "refining the disparity vector."
    - Otherwise, if the reference picture list (e.g., 0 or 1) uses BVSP mode, the associated motion vector is returned as the disparity vector. The disparity vector is further refined in a similar way as described above with respect to "refining the disparity vector." However, the maximum depth value is selected from all pixels of the corresponding depth block rather than four corner pixels.

Indication of BVSP Coded PUs

The introduced BVSP mode is treated as a special inter-coded mode, and a flag indicating the usage of BVSP mode should be maintained for each PU. Rather than signaling the flag in the bitstream, a new merging candidate (BVSP merging candidate) is added to the merge candidate list, and the flag is dependent on whether the decoded merge candidate index corresponds to a BVSP merging candidate. The BVSP merging candidate is defined as follows:

- Reference picture index for each reference picture list: −1
- Motion vector for each reference picture list: the refined disparity vector The inserted position of BVSP merging candidate is dependent on the spatial neighboring blocks:

- If any of the five spatial neighboring blocks (A0, A1, B0, B1, or B2) is coded with the BVSP mode, i.e., the maintained flag of the neighboring block is equal to 1, the BVSP merging candidate is treated as the corresponding spatial merging candidate, and inserted into the merge candidate list. Note that the BVSP merging candidate will only be inserted into the merge candidate list once.
- Otherwise (e.g., if none of the five spatial neighbouring blocks are coded with the BVSP mode), the BVSP merging candidate is inserted into the merge candidate list just before the temporal merging candidates.

It is noted that during the combined bi-predictive merging candidate derivation process, additional conditions should be checked to avoid including the BVSP merging candidate.

Prediction Derivation Process

For each BVSP coded PU, with a corresponding size denoted by N×M, the BVSP coded PU is further partitioned into several sub-regions with the size equal to K×K (where K may be 4 or 2). For each sub-region, a separate disparity motion vector is derived, and each sub-region is predicted from one block located by the derived disparity motion vector in the inter-view reference picture. In other words, the size of motion-compensation units for BVSP coded PUs are set to K×K. In some common test conditions, K is set to 4.

Disparity Motion Vector Derivation Process

For each sub-region (e.g., 4×4 block) within one PU coded with BVSP mode, a corresponding 4×4 depth block is first located in the reference depth view with the refined disparity vector described above. Secondly, the maximum value of the sixteen depth pixels in the corresponding depth block is selected. Thirdly, the maximum value is converted to the horizontal component of a disparity motion vector. The vertical component of the disparity motion vector is set to 0.

Inter-View Candidate Derivation Process for Skip/Merge Mode

Based on the disparity vector derived from the DoNBDV scheme, a new motion vector candidate, Inter-view Predicted Motion Vector Candidate (IPMVC), if available, may be added to AMVP and skip/merge modes. The inter-view predicted motion vector, if available, is a temporal motion vector.

Because skip mode has the same motion vector derivation process as merge mode, any or all techniques described herein may apply to both merge and skip modes.

For the merge/skip mode, the inter-view predicted motion vector is derived by the following steps:

- A corresponding block of a current PU/CU in a reference view of the same access unit is located by (or using) the disparity vector.
- If the corresponding block is not intra-coded and not inter-view predicted, and the corresponding block's reference picture has a POC value equal to that of one entry in the same reference picture list of the current PU/CU, the corresponding block's motion information (prediction direction, reference pictures, and motion vectors), after converting the reference index based on POC, is derived to be the inter-view predicted motion vector.

In addition, the disparity vector is converted to an inter-view disparity motion vector, which is added into the merge candidate list in a different position from the IPMVC, or added into the AMVP candidate list in the same position as IPMVC when the inter-view disparity motion vector is available. Either the IPMVC or the Inter-view Disparity Motion Vector Candidate (IDMVC) is called 'inter-view candidate' in this context.

In the merge/skip mode, the IPMVC, if available, is always inserted before all spatial and temporal merging candidates to the merge candidate list. The IDMVC is inserted before the spatial merging candidate derived from $A_0$.

4. Derivation Process for Combined Bi-Predictive Merging Candidates in 3D-HEVC

If the total number of candidates derived from the above two steps are less than the maximum number of candidates, the same process as defined in HEVC is performed, except the specification of l0CandIdx and l1CandIdx. The relationship among combIdx, l0CandIdx and l1CandIdx are defined in the following table:

TABLE 1

Specification of l0CandIdx and l1CandIdx in 3D-HEVC

| combIdx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| l0CandIdx | 0 | 1 | 0 | 2 | 1 | 2 | 0 | 3 | 1 | 3 | 2 | 3 | 0 | 4 | 1 | 4 | 2 | 4 | 3 | 4 |
| l1CandIdx | 1 | 0 | 2 | 0 | 2 | 1 | 3 | 0 | 3 | 1 | 3 | 2 | 4 | 0 | 4 | 1 | 4 | 2 | 4 | 3 |

Merge Candidate List Construction for Texture Coding in 3D-HEVC

Disparity vector is firstly derived with the method of DoNBDV. With the disparity vector, the merging candidate list construction process in 3D-HEVC can be defined as follows:

1. IPMVC Insertion

IPMVC is derived by the procedure described above. If the IPMVC is available, the IPMVC is inserted into the merge list (e.g., by video encoder 20).

2. Derivation Process for Spatial Merging Candidates and IDMVC Insertion in 3D-HEVC Check the motion information of spatial neighbouring PUs in the following order: A1, B1, B0, A0, or B2. Constrained pruning is performed by the following procedures:

If A1 and IPMVC have the same motion vectors and the same reference indices, A1 is not inserted into the candidate list; otherwise A1 is inserted into the list.

If B1 and A1/IPMVC have the same motion vectors and the same reference indices, B1 is not inserted into the candidate list; otherwise B1 is inserted into the list.

If B0 is available, it is added to the candidate list. IDMVC is derived by the procedure described above (e.g., at various portions of this disclosure). If IDMVC is available, and is different from the candidates derived from A1 and B1, IDMVC is inserted into the candidate list (e.g., by video encoder 20).

If BVSP is enabled for the whole picture or for the current slice, then the BVSP merging candidate is inserted into the merge candidate list.

If A0 is available, A0 is added to the candidate list.

If B2 is available, B2 is added to the candidate list.

3. Derivation Process for Temporal Merging Candidate

Similar to the temporal merging candidate derivation process in HEVC where the motion information of the co-located PU is utilized. However, the target reference picture index of the temporal merging candidate may be changed, instead of fixing the target reference picture index to be 0. When the target reference index equal to 0 corresponds to a temporal reference picture (in the same view) while the motion vector of the co-located prediction unit (PU) points to an inter-view reference picture, the target reference picture index is changed to another index which corresponds to the first entry of inter-view reference picture in the reference picture list. On the contrary, when the target reference index equal to 0 corresponds to an inter-view reference picture while the motion vector of the co-located prediction unit (PU) points to a temporal reference picture, the target reference picture index is changed to another index which corresponds to the first entry of temporal reference picture in the reference picture list.

5. Derivation Process for Zero Motion Vector Merging Candidates

The same procedure as defined in HEVC is performed.

In the latest software, the total number of candidates in the MRG list is up to 6 and five_minus_max_num_merge_cand is signaled to specify the maximum number of the MRG candidates subtracted from 6 in slice header. It should be noted that five_minus_max_num_merge_cand is in the range of 0 to 5, inclusive.

Motion Vector Inheritance for Depth Coding

An idea behind the motion vector inheritance (MVI) is to exploit the similarity of the motion characteristics between the texture images and associated depth images.

Figure 9:
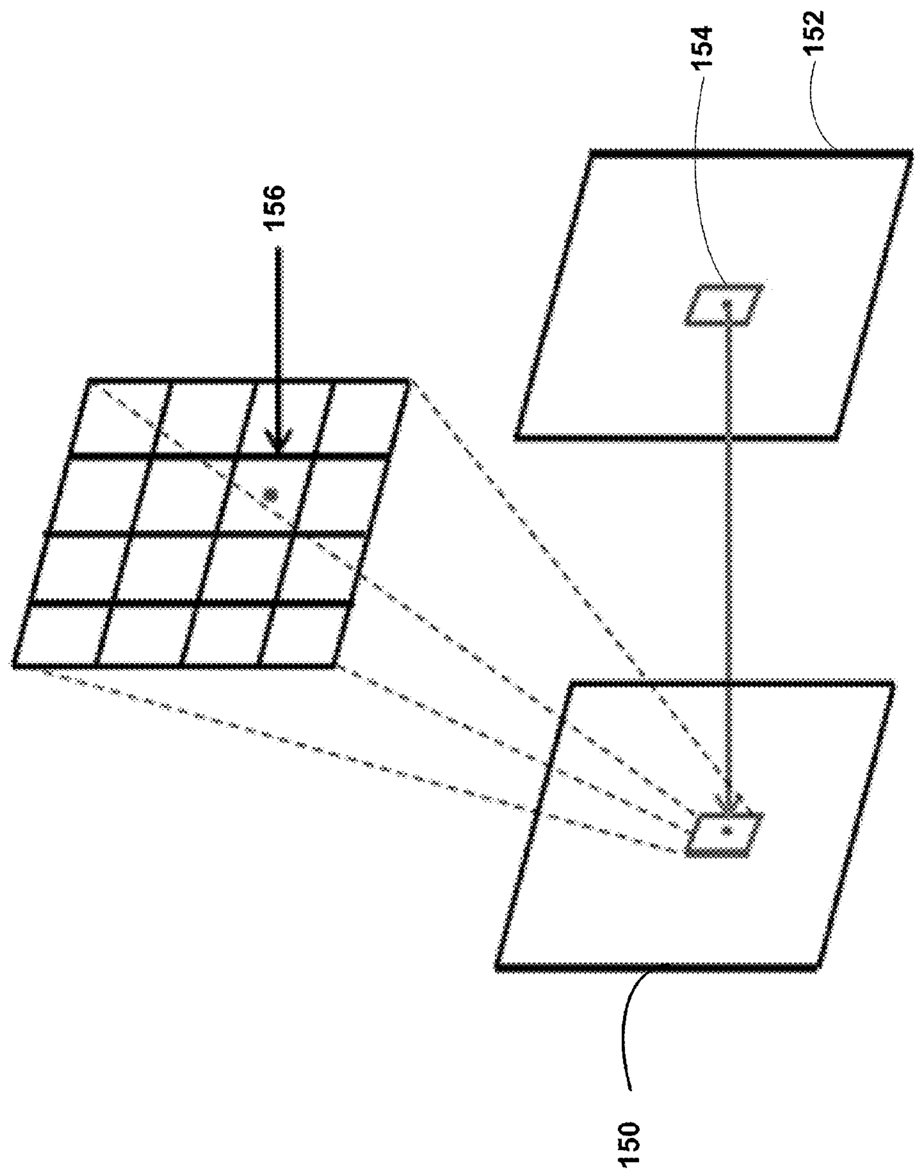
FIG. 9 is a conceptual diagram illustrating derivation of a motion vector inheritance (MVI) candidate for depth coding.

For a given PU in the depth image, the MVI candidate reuses motion vectors and reference indices of the already coded corresponding texture block, if the motion vectors and/or reference indices are available. FIG. 9 shows an example of the derivation process of the MVI candidate where the corresponding texture block is selected as the 4×4 block located to the right bottom of the center of the current PU.

It should be noted that motion vectors with integer precision are used in depth coding, while quarter precision of motion vectors is utilized for texture coding. Therefore, the motion vector of the corresponding texture block shall be scaled before using as an MVI candidate.

With the MVI candidate generation, the merge candidate list for the depth views is constructed as follows:

1. MVI Insertion

MVI is derived by the procedure described above (e.g., at "Motion Vector Inheritance for depth coding). If MVI is available, MVI is inserted (e.g., by video encoder 20) into the merge list.

2. Derivation Process for Spatial Merging Candidates and IDMVC Insertion in 3D-HEVC Check the motion information of spatial neighboring PUs in the following order: A1, B1, B0, A0, or B2. Constrained pruning is performed by the following procedures:

If A1 and MVI have the same motion vectors and the same reference indices, A1 is not inserted into the candidate list.

If B1 and A1/MVI have the same motion vectors and the same reference indices, B1 is not inserted into the candidate list.

If B0 is available, B0 is added to the candidate list.

If A0 is available, A0 is added to the candidate list.

If B2 is available, B2 is added to the candidate list.

3. Derivation process for temporal merging candidate

Similar to the temporal merging candidate derivation process in HEVC, where the motion information of the co-located PU is utilized. However, the target reference picture index of the temporal merging candidate may be changed as explained in "Merge candidate list construction for texture coding in 3D-HEVC," instead of fixing the target reference picture index to be 0.

4. Derivation process for combined bi-predictive merging candidates in 3D-HEVC If the total number of candidates derived from the above two steps are less than the maximum number of candidates, the same process as defined in HEVC is performed, except the specification of l0CandIdx and l1CandIdx. The relationship among combIdx, l0CandIdx and l1CandIdx are defined in table 1 of this disclosure.

5. Derivation Process for Zero Motion Vector Merging Candidates

The same procedure as defined in HEVC is performed.

Inter-View Residual Prediction

Figure 7:
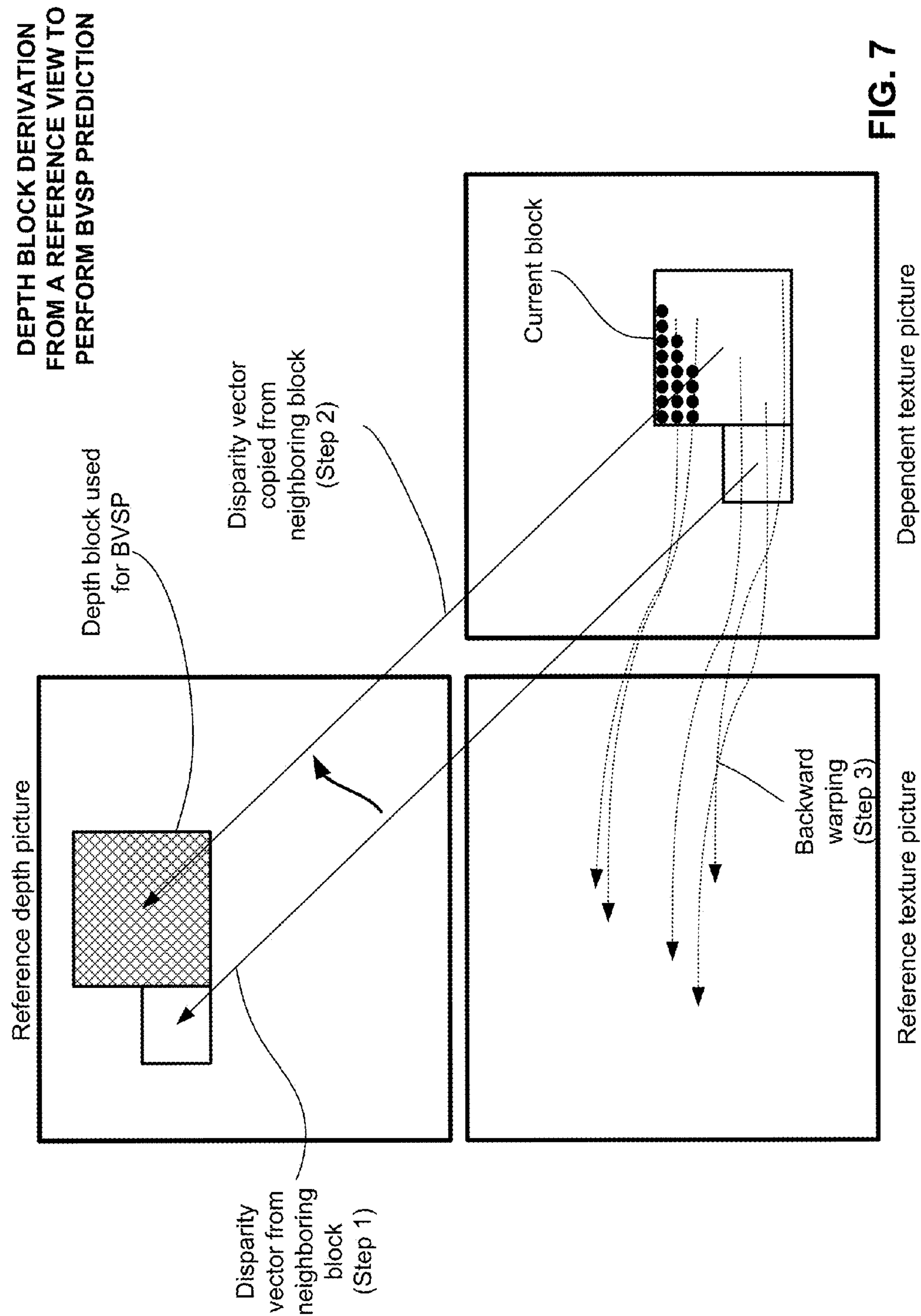
FIG. 7 illustrates an example three step process by which a video coding device may locate a depth block from the base view, and use the located depth block for BVSP prediction.

In the current 3D-HEVC, to more efficiently utilize the correlation between the residual signal of two views, inter-view residual prediction was realized by the so-called Advanced Residual Prediction (ARP), wherein the residual of the reference block identified with the disparity vector was generated on-the-fly, as depicted in FIG. 7, instead of maintaining a residual picture for the reference view and directly predicting the residual within the reference block in the residual picture.

Figure 8:
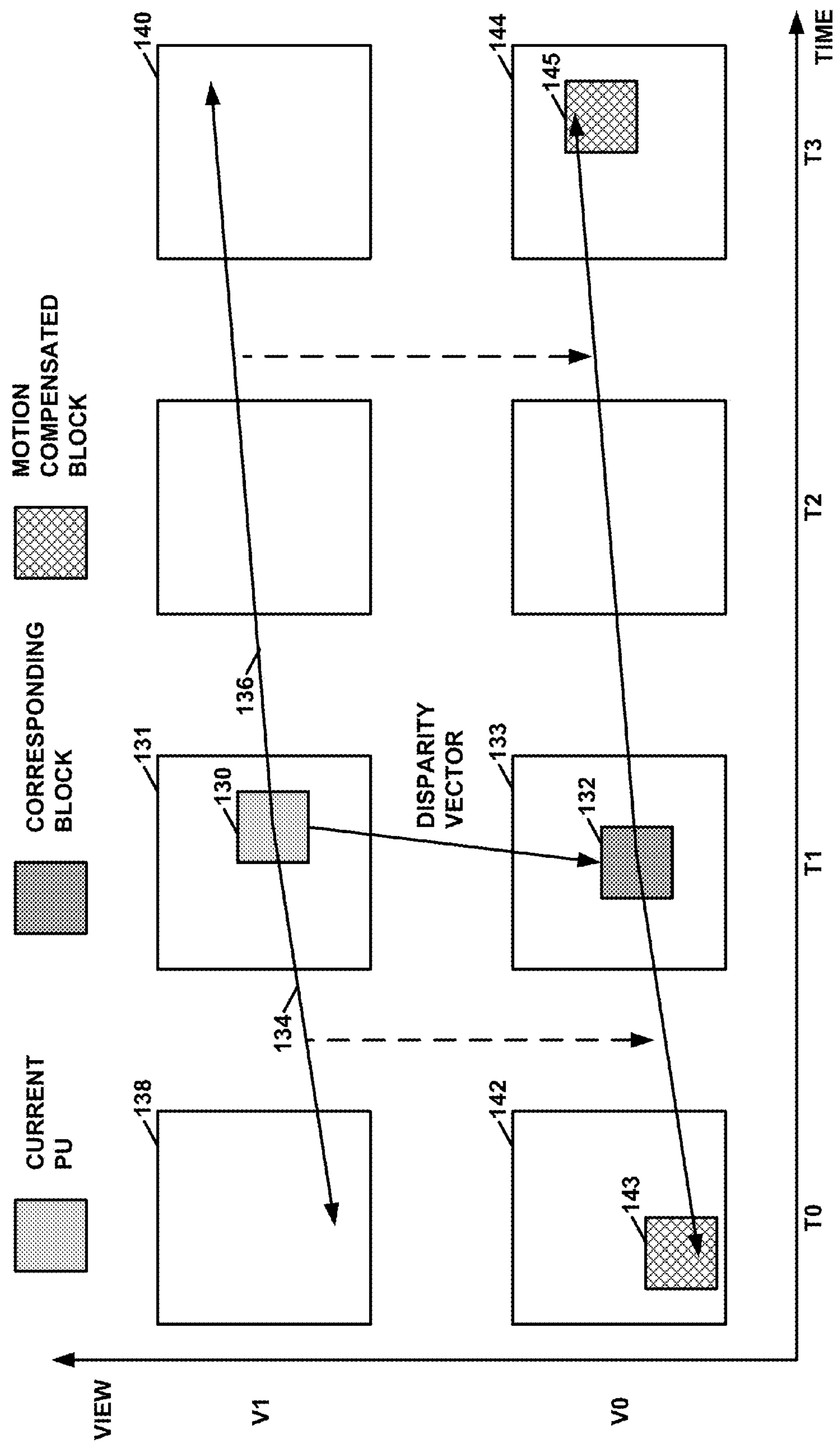
FIG. 8 illustrates the relationship among current block, corresponding block, and motion compensated block described above.

As shown in FIG. 7, to better predict the residual of the current block in a non-base view, denoted as Dc, the reference block Bc is first identified by the disparity vector, and the motion compensation of the reference block is invoked to derive the residual between the prediction signal Br and the reconstructed signal of the reference block Bc. When the ARP mode is invoked, the predicted residual is added on top of the prediction signal of the non-base view, generated by, e.g., motion compensation from the block Dr in the reference picture of the non-base view. A potential advantage of the ARP mode is that the motion vector used by the reference block (when generating the residue for ARP) is aligned with the motion vector of the current block, so the residual signal of the current block can be more precisely predicted. Therefore, the energy of the residue can be significantly reduced. FIG. 8 illustrates various components of FIG. 7, but without texture details of the different images. It will be appreciated that, for ease of illustration purposes only, FIG. 8 is not drawn to scale with respect to FIG. 7.

Since quantization difference(s) between base (reference) and non-base views may lead to less prediction accuracy, two weighting factors are adaptively applied to the residue generated from the reference view: 0.5 and 1.

Since additional motion compensation at the base (reference) view may require significant increase of memory access and calculations, several ways to make the design more practical with minor sacrifice of coding efficiency have been adopted. Firstly, ARP mode is only enabled when the Prediction Unit (PU) is coded with 2N×2N, to reduce the computations, especially at the encoder. Secondly, bi-linear filters are adopted for the motion compensation of both the reference block and the current block, to significantly reduce the memory access for blocks coded with the ARP mode. Thirdly, to improve the cache efficiency, although motion vectors may point to different pictures in the non-base view, the reference picture in the base view is fixed. In this case, the motion vector of the current block may need to be scaled based on the picture distances.

Potential Issues

The current design of motion related technologies for the depth coding in HEVC based multiview/3DV coders has the following potential issue: The motion vector predictive coding of the non-base depth views fails to consider the motion information of the already coded reference (base) depth views for the merge/skip modes. In other words, the correlation between the motion information (including reference index and motion vectors) of the video block in one non-base depth view and the corresponding block in the reference depth view is not exploited.

Techniques

This disclosure is directed to one or more techniques to improve the motion vector prediction accuracy of the dependent depth views by deriving more candidates from the already coded motion vectors of the reference depth views. The techniques may be performed by a variety of devices, including, but not limited to, video encoder 20 and/or video decoder 30 described herein. For purposes of discussion, the techniques are described with respect to video encoder 20 and/or various components thereof, such as motion estimation unit 42 and/or motion compensation unit 44. To derive the merge candidates, video encoder 20 may first derive a disparity vector from the neighboring reconstructed depth values. Then, video encoder 20 may generate additional merge candidates based on this derived disparity vector and added into the merge candidate list.

Aspects of this disclosure are further summarized as follows:

Denote (x, y) be the top left corner of a relevant block.

I. Video encoder 20 may derive a single disparity vector may be derived for each block based on the neighboring pixels adjacent to the corners of the current block, by applying a mathematical operation, such as average, maximum or median to the neighboring samples to get a depth value. Video encoder 20 may directly convert the depth value to a disparity vector.

1) The neighboring samples can be adjacent to the above-left, above-right and bottom-left reconstructed depth samples of a block, e.g., neighboring reconstructed depth samples at locations {(x−1, y−1), (x−1, y+Width−1) and (x+Height−1, y−1)}. The disparity vector that is derived (e.g., by video encoder 20) for each CU is shared for all the PUs therein. Here, the size of the video block is Width×Height.

2) Alternatively, video encoder 20 may use five neighboring reconstructed depth samples at locations {(x−1, y−1), (x−1, y+2N), (x−1, y+2N−1), (x+2N, y−1)} and (x+2N−1, y−1)} to derive a depth value.

3) In one example, for all PUs in a CU, the process applies to a block that is the CU and all PUs share the same disparity vector derived by video encoder 20 for that block.

4) In one example, each PU can be an independent block, and video encoder 20 may use the disparity vector derived for that block for a current PU.

II. Similar to a texture PU which contains IPMVC and IDMVC candidates, for the current depth PU, video encoder 20 may use the disparity vector derived for a PU to derive an inter-view predicted motion vector candidate (IPMVC) that is generated (e.g., by video encoder 20) from the motion information of the corresponding block in the reference view and/or to derive an inter-view disparity motion vector candidate (IDMVC) by converting the disparity vector into a disparity motion vector. Video encoder 20 may add the generated additional candidates IPMVC and IDMVC to the merge candidate list for depth coding, if the additional candidates are available.

1) In one alternative, video encoder 20 may generate IDMVC only when IPMVC is unavailable.
2) In another alternative, video encoder 20 may generate IDMVC only when IPMVC is available. However, in some examples of this alternative, video encoder 20 may not include one or both of IDMVC and IPMVC in the merge list after pruning
3) In one example, video encoder 20 may apply rounding of motion vectors while converting the disparity vector into a disparity motion vector. For e.g., let the disparity vector be in quarter precision, and denoted by (mvX, 0). In this example, video encoder 20 may convert the disparity vector to a disparity motion vector as (mvX>>2, 0) or as ((mvX+2)>>2, 0) in integer precision.

III. Video encoder 20 may insert additional merge candidates into the merge candidate list with positions relative to the originally generated spatial, temporal and MVI merge candidates.

1) Alternatively, video encoder 20 may insert the additional merge candidates first after the spatial and temporal merge candidates in relative positions of these candidates. Afterwards, video encoder 20 may insert the MVI candidate into the merge candidate list containing spatial, temporal and the IPMVC and/or IDMVC merge candidates.
2) In one example, the relative positions of IPMVC and/or IDMVC, as determined by is inserted, are the same as those used for a texture block. That is, video encoder 20 may add IPMVC immediately before all spatial merging candidates; therefore, after the MVI candidate (derived from the co-located texture block). Additionally, video encoder 20 may add IDMVC right before (immediately before) the merging candidate derived from B0.
3) In another example, the relative positions of the IPMVC and/or the IDMVC may be different from those used in 3D-HEVC texture coding.
   In one alternative, video encoder 20 may add IPMVC immediately after the MVI candidate and may insert IDMVC candidate right next to (immediately next to) the spatial candidate B1 and right before (immediately before) the spatial candidate B0.
   In another alternative, video encoder 20 may insert the IPMVC candidate right next to (immediately next to) the spatial candidate A1, and the IDMVC candidate may be inserted after the candidate B0.
   In another alternative, video encoder 20 may insert the IPMVC candidate before the MVI candidate and may insert the IDMVC candidate after the candidate B1.

III-A. Video encoder 20 may derive more IPMVCs from the reference view from shifted disparity vectors of the current PU/CU to generate the merge candidate list. Such IPMVCs are referred to herein as "shifted IPMVCs."

1) Video encoder 20 may shift the disparity vector DV horizontally by $DV[0]+M_1$ and vertically by $DV[1]+M_2$. Additionally, video encoder 20 may use the shifted disparity vector $(DV[0]+M_1, DV[1]+M_2)$ to locate the corresponding block in the reference view in order to generate the IPMVC. If the IPMVC is available, video encoder 20 may use the available IPMVC as the additional candidate for the merge candidate list.

III-B. If an IPMVC from a shifted disparity vector, as in Section III-A, bullet #1 above is unavailable, video encoder 20 may use the first available disparity motion vector (DMV) corresponding to the RefPicList0 of the spatial neighboring blocks $A_1$, $B_1$, $B_0$, $A_0$ or $B_2$ to derive an additional candidate by shifting the horizontal component of the mv[0] (which is the available disparity motion vector) to generate the additional motion vector candidate MvC. This candidate is denoted as Disparity Shifted Motion Vector (DSMV).

1) If the DMV is available, MvC[0]=mv[0], MvC[1]=mv[1] and MvC[0][0]+=N, video encoder 20 may inherit reference indices from the first available candidate (which contains the DMV).
2) If the DMV is unavailable, video encoder 20 may generate no additional candidates for the fixed N.

III-C. Video encoder 20 may first generate the DSMV as described above (e.g. in III-B). If the DSMV is not available via the derivation described in III-B above, video encoder 20 may derive the DSMV (denoted as MvC) by setting the motion vectors to vectors shifted from disparity vector, more specifically as follows:

1) MvC[0]=DV and MvC[0][0]+=N; MvC[0][1]=0 and MvC[1]=DV and MvC[1][0]+=N; MvC[1][1]=0 and the reference index corresponding to MvC[X] is set to the reference index of the picture in RefPicListX which belongs to the reference view as identified during the NBDV process together with the disparity vector. Alternatively, video encoder 20 may set a reference index associated with RefPicListX is set to −1. Video encoder 20 may set N to any of values 4, 8, 16, 32, 64, −4, −8, −16, −32, −64.

III-D. Video encoder 20 may use the shift values $M_1$ and $M_2$ used to generate the shifted IPMVC may or may not be the same.

1) Video encoder 20 may set $M_1$ and $M_2$ to any of values 4, 8, 16, 32, 64, −4, −8, −16, −32, −64.
2) In one alternative, M1 may be equal to (((Width/2)*4)+4) and M2 may be equal to (((Height/2)*4)+4), where the current PU size is Width×Height.

IV. Video encoder 20 may apply constrained pruning for each of the additional merge candidates that include an IPMVC and IDMVC.

1) In one example, video encoder 20 may only prune IPMVC by comparing with MVI candidate.
2) In one example, video encoder 20 may only prune IDMVC by comparing with the spatial merging candidates derived from A1 and/or B1.
3) In one example, in addition to pruning the IPMVC with the MVI, video encoder 20 may also prune the spatial candidates A1 and B1 with both the IPMVC and MVI.

Example Implementation

In the sections below, the implementation of one example method of the proposed methods (e.g., as may be implemented by video encoder 20 and/or various components thereof) is described for generating the additional candidates for the merge candidate list.

Example #1

Video encoder 20 may derive a single disparity vector (DV) for each CU and the single DV is applied for all PUs therein.

Video encoder 20 may derive the disparity vector from the average depth values of the neighboring reconstructed depth samples at locations {(x−1, y−1), (x−1, y+2N−1) and (x+2N−1, y−1)}, if available. Otherwise, video encoder 20 may set the disparity vector to a zero vector.

Video encoder 20 may add the IPMVC candidate, if available, right after (immediately after) the MVI candidate and right before (immediately before) the spatial candidate A1.

Video encoder 20 may generate the IDMVC by converting the disparity vector DV=(mvX, 0) into a disparity motion vector as ((mvX+2)>>2, 0).

Video encoder 20 may insert the IDMVC candidate is inserted right next to (e.g., adjacent to) the spatial candidate B1.

Merge Candidate List Construction for Depth Views with Additional Candidates

Video encoder 20 may insert the additional candidates IPMVC and IDMVC in the merge candidate list. The steps of inserting the additional candidates IPMVC and IDMVC (e.g., as may be implemented by video encoder 20 and/or various components thereof) are described below.

1. MVI Insertion

Video encoder 20 may derive MVI by the procedure described above. If MVI is available, video encoder 20 may insert MVI into the merge list.

2. IPMVC Insertion

Video encoder 20 may derive IPMVC by the procedure described in bullet II above. If IPMVC is available, and is different from the MVI candidate, video encoder 20 may insert IPMVC into the merge candidate list; otherwise IPMVC is not inserted in the list.

3. Derivation Process for Spatial Merging Candidates and IDMVC Insertion in 3D-HEVC Video encoder 20 may check the motion information of spatial neighbouring PUs in the following order: A1, B1, B0, A0, or B2. Video encoder 20 may perform constrained pruning according to the following procedures:

- If A1 and MVI have the same motion vectors and the same reference indices, video encoder 20 may not insert A1 into the candidate list.
- If B1 and A1/MVI have the same motion vectors and the same reference indices, video encoder 20 may not insert B1 into the candidate list.
- Video encoder 20 may derive IDMVC by the procedure described in bullet II above. If IDMVC is available and is different from the candidates derived from A1 and B1, video encoder 20 may insert IDMVC into the candidate list. Otherwise, video encoder 20 may not insert IDMVC into the list.
- If B0 is available, video encoder 20 may add B0 to the candidate list.
- If A0 is available, video encoder 20 may add A0 to the candidate list.
- If B2 is available, video encoder 20 may add B2 to the candidate list.

4. Derivation Process for Temporal Merging Candidate

Similar to the temporal merging candidate derivation process in HEVC where the motion information of the co-located PU is utilized. However, video encoder 20 may change the target reference picture index of the temporal merging candidate as explained in "Merge candidate list construction for texture coding in 3D-HEVC" above, instead of fixing the target reference picture index to be 0.

5. Derivation Process for Combined Bi-Predictive Merging Candidates in 3D-HEVC

If the total number of candidates derived from the above two steps are less than the maximum number of candidates, video encoder 20 may perform the same process as defined in HEVC, except the specification of l0CandIdx and l1CandIdx. The relationship among combIdx, l0CandIdx and l1CandIdx are defined in the table 1 of this disclosure.

6. Derivation Process for Zero Motion Vector Merging Candidates

- Video encoder 20 may perform the same procedure as defined in HEVC.

Alternatively, furthermore, video encoder 20 may perform an added (new) step just before invoking step #4 ("Derivation process for temporal merging candidate"). In other words, video encoder 20 may perform the added step after performing step #3 ("Derivation process for spatial merging candidates and IDMVC insertion in 3D-HEVC") described above. The new step performed by video encoder 20 is described as follows:

- Derivation process for a shifted candidate from DV or spatial neighboring blocks
  - First, video encoder 20 may generate an additional IPMVC using an input disparity vector equal to the DV with a shifting vector (M1, M2).
  - If the additional IPMVC is available, and is different from the IPMVC (derived using step #2 ("IPMVC insertion") above), video encoder 20 may add the additional IPMVC to the merge candidate list.
  - Otherwise, if the additional IPMVC is unavailable, video encoder 20 may apply the following:
    - Video encoder 20 may check the candidates from spatial neighbors first, and video encoder 20 may identify the first one of checked candidates that contains a disparity motion vector.
    - If such a candidate is available, video encoder 20 may keep the other portion of the candidate (including possibly a temporal motion vector) unchanged, but may shift the horizontal component of the disparity motion vector by L. Video encoder 20 may add the shifted candidate to the merge candidate list. Otherwise, video encoder may set a new candidate to a disparity motion vector candidate with an input disparity vector equal to DV, with the horizontal component shifted by N. Video encoder 20 may then round the shifted disparity vector to integer precision, and add the rounded shifted disparity vector to the merge candidate list.

In one example, video encoder 20 may set M1 and M2 to the width and height of the current PU, respectively.

In one example, video encoder 20 may set L to 1, −1, 4 or −4, N is set to 1, −1, 4 or −4.

Example #2

Video encoder 20 may derive a single disparity vector (DV) for each CU, and may apply the derived DV for all PU's therein. Video encoder 20 may derive the disparity vector from the single depth value, which video encoder 20 may calculate using a weighted average of three neighboring reconstructed depth samples with weights (5,5,6). More specifically, video encoder may calculate a single depth value as follows:

```
If(xC > 0 && yC > 0)
    Depth = ( 5*D[ xC−1 ][ yC−1 ] + 5*D[ xC−1 ][ yC+2N −1 ] +6*D[
xC+2N −1 ][ yC−1 ] + 8 )>>4;
elseif(xC >0 && yC ==0))
    Depth= D[ xC−1 ][ 2N−1 ];
elseif(xC == 0 && yC > 0))
    Depth = D[ 2N −1 ][ yC−1 ];
```

Here, (xC, yC) represents the top-left corner of current CU of size 2N×2N. Video encoder 20 may convert the calculated depth value (Depth) into a disparity vector DV, if available. Otherwise, video encoder 20 may set the disparity vector DV to a zero vector (0, 0).

Video encoder 20 may use the derived disparity vector to derive the IPMVC candidate. If IPMVC is available, video encoder 20 may add the IPMVC right after the MVI candidate and right before the spatial candidate $A_1$ in the merge list. Video encoder 20 may generate the IDMVC by converting the disparity vector DV=(mvX, 0) into a disparity motion vector as ((mvX+2)>>2, 0).

Video encoder 20 may insert the IDMVC candidate right next to the spatial candidate $B_1$. In accordance with Example #2, the merge candidate list construction process is the same as described with respect to Example #1, where the additional inserted candidates are distinguished by underlining Video encoder 20 of FIG. 2 represents an example of a video encoder configured to perform various methods described in this disclosure. According to various examples described herein, video encoder 20 may be configured or otherwise operable to perform a method of coding video data, the method including determining a depth value associated with a block of video data included in a dependent depth view based on one or more neighboring pixels positioned adjacent to the block of video data in the dependent depth view, and generating a disparity vector associated with the block of video data based at least in part on the determined depth value associated with the block of video data. The method may further include generating an inter-view disparity motion vector candidate (IDMVC) based on the disparity vector, generating an inter-view predicted motion vector candidate (IPMVC) associated with the block of video data based on a corresponding block of video data in a base view, and determining whether to add any of the IDMVC or the IPMVC to a merge candidate list associated with the block of video data. In various examples, determining whether to add any of the IDMVC or the IPMVC to the merge candidate list may include determining whether to add one, both, or neither of the IDMVC or the IPMVC to the merge candidate list. In some examples, determining the depth value may include calculating a weighted average of values associated with the one or more neighboring pixels. In some examples, the one or more neighboring pixels include an above-left pixel, an above-right pixel, and a below-right pixel with respect to the block of video data. In some examples, calculating the weighted average comprises applying weights of five (5), six (6), and five (5) to the above-left pixel, an above-right pixel, and a below-right pixel, respectively, to obtain a plurality of weighted values.

In some examples, calculating the weighted average further includes obtaining a sum based on the plurality of weighted values, and obtaining an offset sum based on an offset value and the sum. According to some examples, calculating the weighted average further includes dividing the offset sum by a predetermined value. In one such example, the offset value comprises a value of eight (8) and the predetermined value comprises a value of sixteen (16). According to some examples, determining the depth value comprises calculating at least one of a mean value, a median value, or a mode value associated with the one or more neighboring pixels. According to some examples, the block of video data is a coding unit (CU), and the generated disparity vector applies to all prediction units (PUs) included in the CU. In some examples, generating the IPMVC comprises deriving the IPMVC from the corresponding block of video data in the base view.

According to various examples, the method further includes shifting the disparity vector spatially to form a shifted disparity vector, and using the shifted disparity vector to locate a corresponding block of video data in the base view. In some such examples, the method further includes determining whether a shifted IPMVC is available from the located corresponding block of video data in the base view, and based on determining that the shifted IPMVC is available, determining whether to add the shifted IPMVC to the merge list. In some examples, each of one or more spatial neighboring blocks of the current block is associated with a respective reference picture list 0 and a respective reference picture list 1. In some such examples, the method further includes determining that the shifted IPMVC is not available from the base view, determining whether at least one respective reference picture list 0 associated with the spatial neighboring blocks contains a disparity motion vector, based on determining that the at least one respective reference picture list 0 associated with the spatial neighboring blocks contains the disparity motion vector, shifting a horizontal component of the disparity motion vector contained in the respective reference picture list 0 to form a disparity shifted motion vector (DSMV) candidate; and adding the DSMV candidate to the merge list.

In some examples, the method further includes determining that none of the respective reference picture lists 0 contains the disparity motion vector, applying an offset value to the disparity vector to form the DSMV candidate, and applying the DSMV candidate to the merge list. According to some examples, determining the depth value includes determining that the one or more neighboring pixels include only one available neighboring pixel, and inheriting a depth value of the one available neighboring pixel to form the depth value of the block of video data. In some examples, the method further includes determining that none of the one or more neighboring pixels is available, where generating the disparity vector comprises at least one of setting the disparity vector to a zero vector or setting the depth value associated with the block of video data to a default depth value.

In accordance with various aspects of this disclosure, video encoder 20 may perform a method of coding video data, the method including comparing an inter-view predicted motion vector candidate (IPMVC) to a motion vector inheritance (MVI) candidate, where the IPMVC and the MVI candidate are each associated with a block of video data in a dependent depth view, and where the IPMVC is generated from a corresponding block of video data in a base depth view. The method may further include performing one of adding the IPMVC to a merge candidate list based on the IPMVC being different from the MVI candidate, or omitting the IPMVC from the merge candidate list based on the IPMVC being identical to the MVI candidate. In some examples, adding the IPMVC to the merge list includes performing one of inserting the IPMVC at an initial position within the merge candidate list based on the MVI candidate being unavailable for addition to the merge candidate list, or inserting the IPMVC at a position within the merge candidate list that follows a position of the MVI candidate within the merge candidate list based on the MVI candidate being available for addition to the merge candidate list. In various examples, the initial position is associated with an index value of zero (0). According to some examples, comparing the IPMVC to the MVI candidate includes comparing motion information associated with the IPMVC to corresponding motion information associated with the MVI candidate, and comparing at least one reference index associated with the IPMVC to at least one corresponding reference index associated with the MVI candidate.

In some examples, the method further includes comparing an inter-view disparity motion vector candidate (IDMVC) to an available one or more of a first spatial candidate associated with the merge candidate list and a second spatial candidate associated with the merge candidate list, where each of the IDMVC, the first spatial candidate, and the second spatial candidate is associated with the block of video data in the dependent depth view, and where the IDMVC is generated from a disparity vector associated with the block of video data. In some examples, the method further includes performing one of adding the IDMVC to the merge candidate list based on the IDMVC being different from each of the available one or more of the first spatial candidate and the second spatial candidate, or omitting the IDMVC from the merge candidate list based on the IDMVC being identical to at least one of the first spatial candidate or the second spatial candidate.

In some examples, adding the IDMVC to the merge candidate list includes inserting the IDMVC at a next available position within the merge candidate list. According to some examples, inserting the IDMVC at the next available position within the merge candidate list includes inserting the IDMVC at a position that follows a position of at least one of the first spatial candidate or a position of the second spatial candidate.

According to various examples, the method further includes determining that a shifted IPMVC is available, where the shifted IPMVC is associated with the block of video data in the dependent depth view, and where the shifted IPMVC is generated from the corresponding block of video data in the base depth view. In some such examples, the method further includes comparing the shifted IPMVC to the IPMVC. In some examples, the method further includes performing one of adding the shifted IPMVC to the merge candidate list based on the shifted IPMVC being different from the IPMVC and the merge candidate list including less than six (6) candidates, or omitting the shifted IPMVC from the merge candidate list based on the shifted IPMVC being identical to the IPMVC.

In some examples, the method further includes determining that a disparity shifted motion vector (DSMV) candidate is available, where the DSMV candidate is associated with the block of video data in the dependent depth view, and where the DSMV candidate is generated using one or more spatial neighboring blocks associated with the block of video data in the dependent depth view. According to some such examples, the method further includes adding the DSMV candidate to the merge candidate list, based on the merge candidate list including less than six (6) candidates. In some examples, adding the DSMV candidate to the merge candidate list includes inserting the DSMV candidate at a position that: 1) follows a position of a spatial candidate included in the merge candidate list, and 2) precedes a position of a temporal candidate included in the merge candidate list.

According to some examples, determining that the DSMV candidate is available is responsive to determining that a shifted IPMVC is not available, where the shifted IPMVC is associated with the block of video data in the dependent depth view, and where the shifted IPMVC is generated from the base view of the block of video data. In some examples, the DSMV candidate includes a disparity motion vector (DMV) selected from a reference picture list 0 (RefPicList0) associated with at least one spatial neighboring sample of the one or more spatial neighboring samples. According to some examples, the DSMV candidate is generated by shifting a disparity vector associated with the block of video data in the dependent depth view, and the disparity vector is generated from one or more depth values associated with the one or more spatial neighboring blocks associated with the block of video data in the dependent depth view.

Figure 3:
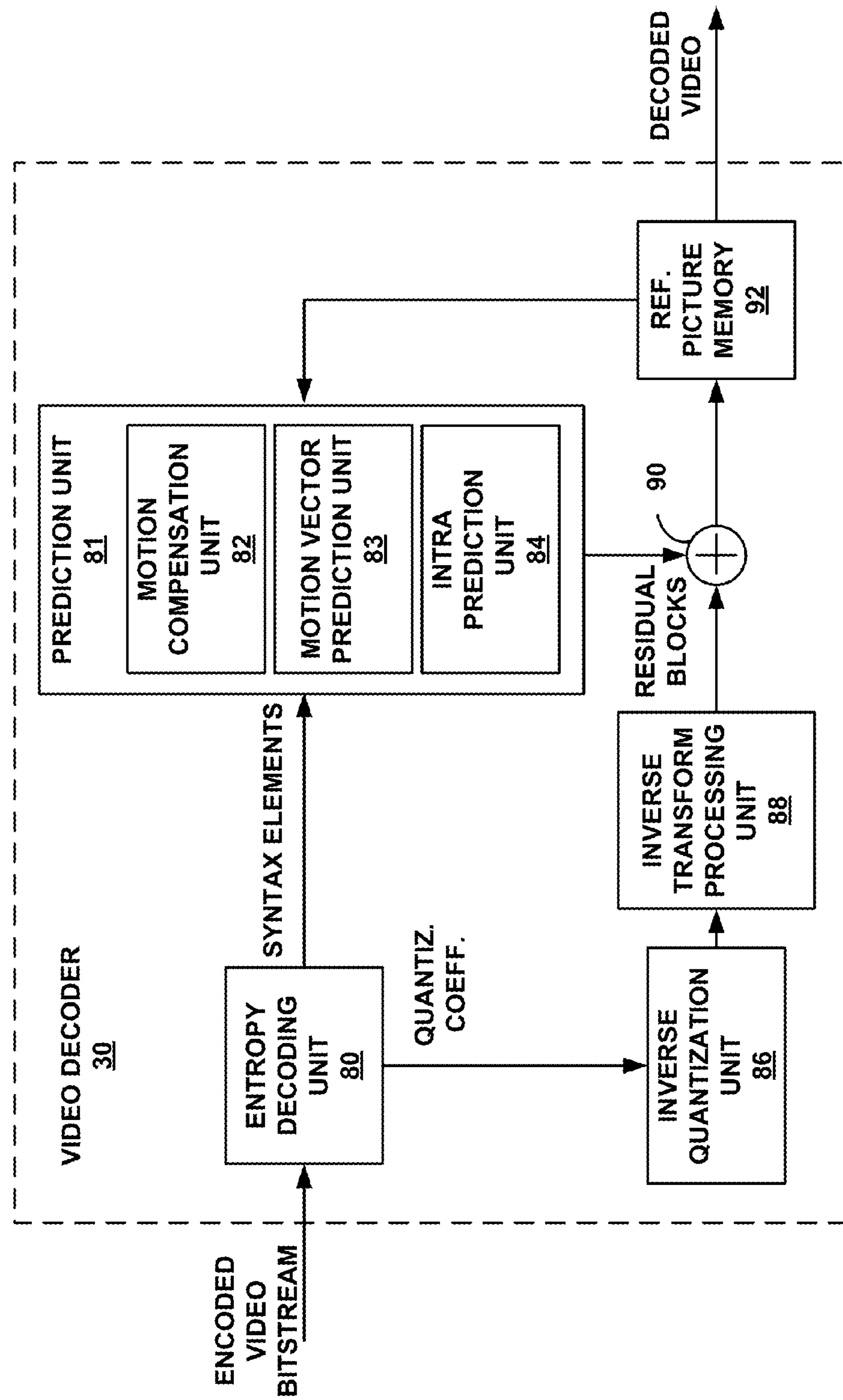
FIG. 3 is a block diagram illustrating an example of a video decoder that may implement or otherwise utilize techniques for depth oriented inter-view motion vector prediction in video coding.

FIG. 3 is a block diagram illustrating an example of video decoder 30 that may implement or otherwise utilize techniques for depth oriented inter-view motion vector prediction in video coding. In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference frame memory 82 also stores decoded video for later presentation on a display device, such as display device 32 of FIG. 1.

In various examples, one or both of video decoder 30 or video encoder 20 (and/or various component(s) thereof) may represent, include, be, or be part of an apparatus for coding video data, the apparatus including means for determining a depth value associated with a block of video data included in a dependent depth view, based on one or more neighboring pixels positioned adjacent to the block of video data in the dependent depth view, means for generating a disparity vector associated with the block of video data, based at least in part on the determined depth value associated with the block of video data, means for using the disparity vector to generate an inter-view disparity motion vector candidate (IDMVC), means for generating an inter-view predicted motion vector candidate (IPMVC) associated with the block of video data based on a corresponding block of video data in a base view, and means for determining whether to add any of the IDMVC and the IPMVC to a merge candidate list associated with the block of video data.

In various examples, one or both of video decoder 30 or video encoder 20 (and/or various component(s) thereof) may represent, include, be, or be part of a computer-readable storage medium encoded with instructions that, when executed, cause one or more processors of a video coding device to determine a depth value associated with a block of video data included in a dependent depth view, based on one or more neighboring pixels positioned adjacent to the block of video data in the dependent depth view, generate a disparity vector associated with the block of video data, based at least in part on the determined depth value associated with the block of video data, use the disparity vector to generate an inter-view disparity motion vector candidate (IDMVC), generate an inter-view predicted motion vector candidate (IPMVC) associated with the block of video data based on a corresponding block of video data in a base view, and determine whether to add any of the IDMVC and the IPMVC to a merge candidate list associated with the block of video data.

In various examples, one or both of video decoder 30 or video encoder 20 (and/or various component(s) thereof) may represent, include, be, or be part of an apparatus for coding video data, the apparatus including means for comparing an inter-view predicted motion vector candidate (IPMVC) to a motion vector inheritance (MVI) candidate, where the IPMVC and the MVI candidate are each associated with a block of video data in a dependent depth view, and where the IPMVC is generated from a corresponding block of video data in a base depth view. The apparatus may further include means for performing one of adding the IPMVC to a merge candidate list based on the IPMVC being different from the MVI candidate, or omitting the IPMVC from the merge candidate list based on the IPMVC being identical to the MVI candidate.

In various examples, one or both of video decoder 30 or video encoder 20 (and/or various component(s) thereof) may represent, include, be, or be part of a computer-readable storage medium encoded with instructions that, when executed, cause one or more processors of a video coding device to compare an inter-view predicted motion vector candidate (IPMVC) to a motion vector inheritance (MVI) candidate, where the IPMVC and the MVI candidate are each associated with a block of video data in a dependent depth view, and where the IPMVC is generated from a corresponding block of video data in a base depth view. The instructions, when executed, may further cause the one or more processors of the video coding device to perform one of adding the IPMVC to a merge candidate list based on the IPMVC being different from the MVI candidate, or omitting the IPMVC from the merge candidate list based on the IPMVC being identical to the MVI candidate.

FIG. 4 is a conceptual diagram illustrating an example multi-view decoding order. The multi-view decoding order may be a bitstream order. In the example of FIG. 4, each square corresponds to a view component. Columns of squares correspond to access units. Each access unit may be defined to contain the coded pictures of all the views of a time instance. Rows of squares correspond to views. In the example of FIG. 4, the access units are labeled T0 . . . T11 and the views are labeled S0 . . . S7. Because each view component of an access unit is decoded before any view component of the next access unit, the decoding order of FIG. 4 may be referred to as time-first coding. The decoding order of access units may not be identical to the output or display order.

Multi-view coding may support inter-view prediction. Inter-view prediction is similar to the inter prediction used in H.264/AVC, HEVC, or other video coding specifications and may use the same syntax elements. However, when a video coder performs inter-view prediction on a current video unit (such as a macroblock or PU), the video coder may use, as a reference picture, a picture that is in the same access unit as the current video unit, but in a different view. In contrast, conventional inter prediction only uses pictures in different access units as reference pictures.

FIG. 5 is a conceptual diagram illustrating an example MVC prediction pattern that may be used with MVC, multi-view HEVC, and 3D-HEVC (multi-view plus depth). References to MVC below apply to MVC in general, and are not restricted to H.264/MVC.

In the example of FIG. 5, eight views (S0-S7) are illustrated, and twelve temporal locations (T0-T11) are illustrated for each view. In general, each row in FIG. 5 corresponds to a view, while each column indicates a temporal location. Each of the views may be identified using a view identifier ("view_id"), which may be used to indicate a relative camera location with respect to the other views. In the example shown in FIG. 5, the view IDs are indicated as "S0" through "S7", although numeric view IDs may also be used. In addition, each of the temporal locations may be identified using a picture order count (POC) value, which indicates a display order of the pictures. In the example shown in FIG. 5, the POC values are indicated as "T0" through "T11."

Although a multi-view coded bitstream may have a so-called base view which is decodable by particular decoders and a stereo view pair may be supported, some multi-view bitstreams may support more than two views as a 3D video input. Accordingly, a renderer of a client having a particular decoder may expect 3D video content with multiple views.

Pictures in FIG. 5 are indicated using a shaded block including a letter, designating whether the corresponding picture is intra-coded (that is, an I-frame), or inter-coded in one direction (that is, as a P-frame) or in multiple directions (that is, as a B-frame). In general, predictions are indicated by arrows, where the pointed-to picture uses the point-from object for prediction reference. For example, the P-frame of view S2 at temporal location T0 is predicted from the I-frame of view S0 at temporal location T0.

As with single view video encoding, pictures of a multi-view video sequence may be predictively encoded with respect to pictures at different temporal locations. For example, the b-frame of view S0 at temporal location T1 is pointed to by an arrow pointed from the I-frame of view S0 at temporal location T0, indicating that the b-frame is predicted from the I-frame. Additionally, however, in the context of multi-view video encoding, pictures may be inter-view predicted. That is, a view component can use the view components in other views for reference. For example, inter-view prediction may be realized as if the view component in another view is an inter-prediction reference. The potential inter-view references may be signaled in the Sequence Parameter Set (SPS) MVC extension and may be modified by the reference picture list construction process, which enables flexible ordering of the inter-prediction or inter-view prediction references.

FIG. 5 provides various examples of inter-view prediction. Pictures of view S1, in the example of FIG. 5, are illustrated as being predicted from pictures at different temporal locations of view S1, as well as inter-view predicted from pictures of pictures of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 5, capital "B" and lowercase "b" are intended to indicate different hierarchical relationships between pictures, rather than different encoding methodologies. In general, capital "B" frames are relatively higher in the prediction hierarchy than lowercase "b" frames. FIG. 5 also illustrates variations in the prediction hierarchy using different levels of shading, where a greater amount of shading (that is, relatively darker) pictures are higher in the prediction hierarchy than those pictures having less shading (that is, relatively lighter). For example, all I-frames in FIG. 5 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that pictures relatively higher in the prediction hierarchy should be decoded before decoding pictures that are relatively lower in the hierarchy, such that those pictures relatively higher in the hierarchy can be used as reference pictures during decoding of the pictures relatively lower in the hierarchy. A view order index is an index that indicates the decoding order of view components in an access unit. The view order indices may be implied in a parameter set, such as an SPS.

In this manner, pictures used as reference pictures may be decoded before decoding the pictures that are encoded with reference to the reference pictures. A view order index is an index that indicates the decoding order of view components in an access unit. For each view order index i, the corresponding view_id is signaled. The decoding of the view components follows the ascending order of the view order indexes. If all the views are presented, then the set of view order indexes comprises a consecutively ordered set from zero to one less than the full number of views.

A subset of a whole bitstream can be extracted to form a conforming sub-bitstream. There are many possible sub-bitstreams that specific applications may require, based on, for example, a service provided by a server, the capacity, support, and capabilities of decoders of one or more clients, and/or the preference of one or more clients. For example, a client might require only three views, and there might be two scenarios. In one example, one client may require smooth viewing experience and might prefer views with view_id values S0, S1, and S2, while another client may require view scalability and prefer views with view_id values S0, S2, and S4. Note that both of these sub-bitstreams can be decoded as independent bitstreams and can be supported simultaneously.

With respect to inter-view prediction, inter-view prediction is allowed among pictures in the same access unit (i.e., with the same time instance). When coding a picture in one of the non-base views, a picture may be added into a reference picture list, if the picture is in a different view but with a same time instance. An inter-view prediction reference picture can be put in any position of a reference picture list, similar to any inter prediction reference picture.

Thus, in the context of multi-view video coding, there are two kinds of motion vectors. One kind of motion vector is a normal motion vector that points to a temporal reference picture. The type of inter prediction corresponding to a normal, temporal motion vector may be referred to as motion-compensated prediction (MCP). When an inter-view prediction reference picture is used for motion compensation, the corresponding motion vector is referred to as a "disparity motion vector." In other words, a disparity motion vector points to a picture in a different view (i.e., a disparity reference picture or an inter-view reference picture). The type of inter prediction corresponding to a disparity motion vector may be referred to as "disparity-compensated prediction" or "DCP."

As mentioned above, a multi-view extension of HEVC (i.e., MV-HEVC) and a 3DV extension of HEVC (i.e., 3D-HEVC) are under development. MV-HEVC and 3D-HEVC may improve coding efficiency using inter-view motion prediction and inter-view residual prediction. In inter-view motion prediction, a video coder may determine (i.e., predict) the motion information of a current PU based on the motion information of a PU in a different view than the current PU. In inter-view residual prediction, a video coder may determine residual blocks of a current CU based on residual data in a different view than the current CU using the prediction structure shown on FIG. 5.

To enable inter-view motion prediction and inter-view residual prediction, a video coder may determine disparity vectors for blocks (e.g., PUs, CUs, etc.). In general, a disparity vector is used as an estimator of the displacement between two views. A video coder, such as video encoder 20 or video decoder 30, may use a disparity vector for a block either to locate a reference block (which may be referred to herein as a disparity reference block) in another view for inter-view motion or residual prediction, or the video coder may convert the disparity vector to a disparity motion vector for inter-view motion prediction.

Figure 6:
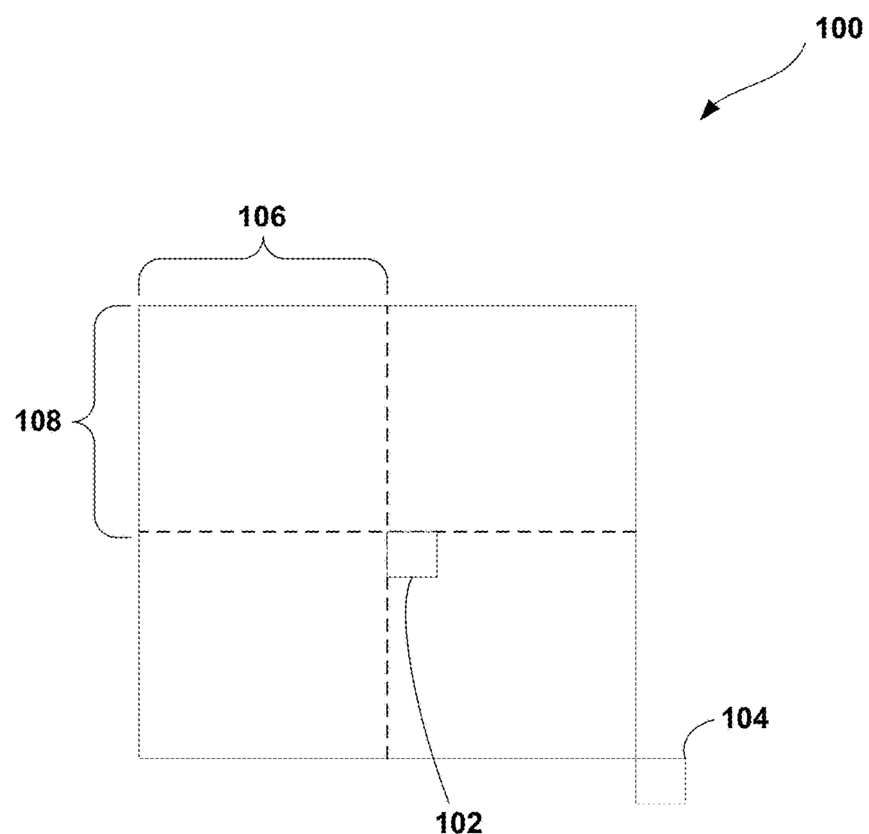
FIG. 6 is a conceptual diagram illustrating temporal neighboring blocks.

FIG. 6 is a conceptual diagram illustrating temporal neighboring blocks. The temporal neighboring blocks illustrated in FIG. 6 may be used in accordance with neighboring block-based disparity vector (NBDV) coding. Additionally, the temporal neighboring blocks illustrated in FIG. 6 may be used by a video coding device, such as video encoder 20 and/or components thereof, to implement one or more of the depth-oriented inter-view motion prediction techniques of this disclosure. FIG. 6 illustrates a CU 100. For instance, CU 100 may be included in a dependent depth view.

As shown in FIG. 6, CU 100 is partitioned in a 4×4 format, illustrating a total of four PUs. Width 106 and height 108 illustrate the width and height of a single PU of CU 100, and respectively represent half the width and half the height of CU 100. For instance, width 106 and height 108 may represent the "width/2" and "height/2" values used by video encoder 20 in calculating offset values $M_1$ and $M_2$. Additionally, center position 102 may represent a center block of a co-located region of the current PU of the CU, such as the co-located region represented in the base view. Similarly, bottom-right position 106 may represent a bottom-right block of the co-located region of the current PU of the CU, such as the co-located region represented in the base view.

FIG. 7 illustrates an example three step process by which video encoder 20 and/or video decoder 30 may locate a depth block from the base view, and use the located depth block for BVSP prediction. In accordance with bi-prediction VSP, when there are multiple interview reference pictures from different views in RefPicList0 and RefPicList1, video encoder 20 and/or video decoder 30 may apply bi-predictive VSP. That is, video encoder 20 may generate the two VSP predictors from each reference list, as described herein. In turn, video encoder 20 may average the two VSP predictors, to obtain the final VSP predictor.

FIG. 8 illustrates the relationship among current block, corresponding block, and motion compensated block described above. In other words, FIG. 8 is a conceptual diagram illustrating an example relationship among a current block, a reference block, and a motion compensated block in ARP. In the example of FIG. 8, a video coder is currently coding a current PU 130 in a current picture 131. Current picture 131 is associated with a view V1 and a time instance T1.

Furthermore, in the example of FIG. 8, the video coder may determine a reference block 132 (i.e., a corresponding block) that comprises actual or interpolated samples of a reference picture 133 that are associated with a location indicated by a disparity vector of current PU 130. For instance, a top-left corner of reference block 132 may be the location indicated by the disparity vector of current PU 130. Temporal-disparity reference block 145 may have the same size as the prediction block of current PU 130.

In the example of FIG. 8, current PU 130 has a first motion vector 134 and a second motion vector 136. Motion vector 134 indicates a location in temporal reference picture 138. Temporal reference picture 138 is associated with view V1 (i.e., the same view as current picture 131) and a time instance T0. Motion vector 136 indicates a location in temporal reference picture 140. Temporal reference picture 140 is associated with view V1 and a time instance T3.

In accordance with the ARP scheme described above, the video coder may determine a reference picture (i.e., reference picture 142) that is associated with the same view as reference picture 133 and is associated with the same time instance as temporal reference picture 138. In addition, the video coder may add motion vector 134 to coordinates of a top-left corner of reference block 132 to derive a temporal-disparity reference location. The video coder may determine a temporal-disparity reference block 143 (i.e., a motion compensated block). Samples in temporal-disparity reference block 143 may be actual or interpolated samples of reference picture 142 that are associated with the temporal-disparity reference location derived from motion vector 134. Temporal-disparity reference block 143 may have the same size as the prediction block of current PU 130.

Similarly, the video coder may determine a reference picture (i.e., reference picture 144) that is associated with the same view as reference picture 133 and is associated with the same time instance as temporal reference picture 140. In addition, the video coder may add motion vector 136 to coordinates of the top-left corner of reference block 132 to derive a temporal-disparity reference location. The video coder may then determine a temporal-disparity reference block 145 (i.e., a motion compensated block). Samples in temporal-disparity reference block 145 may be actual or interpolated samples of reference picture 144 that are associated with the temporal-disparity reference location derived from motion vector 136. Temporal-disparity reference block 145 may have the same size as the prediction block of current PU 130.

Furthermore, in the example of FIG. 8, the video coder may determine, based on temporal-disparity reference block 143 and temporal-disparity reference block 145, a disparity predictive block. The video coder may then determine a residual predictor. Each sample in the residual predictor may indicate a difference between a sample in reference block 132 and a corresponding sample in the disparity predictive block.

FIG. 9 is a conceptual diagram illustrating derivation of a motion vector inheritance (MVI) candidate for depth coding. FIG. 9 illustrates a texture picture 150 and a depth picture 152. For instance, texture picture 150 and depth picture 152 may correspond to each other in accordance with 3D HEVC. Additionally, FIG. 9 illustrates a current PU 154, which is included in depth picture 152. As shown, current PU 154 corresponds to a texture block (or "corresponding texture block") 156. In various examples, video encoder 20 may derive the MVI candidate of the merge list based on current PU 154 and corresponding texture block 156.

Figure 10:
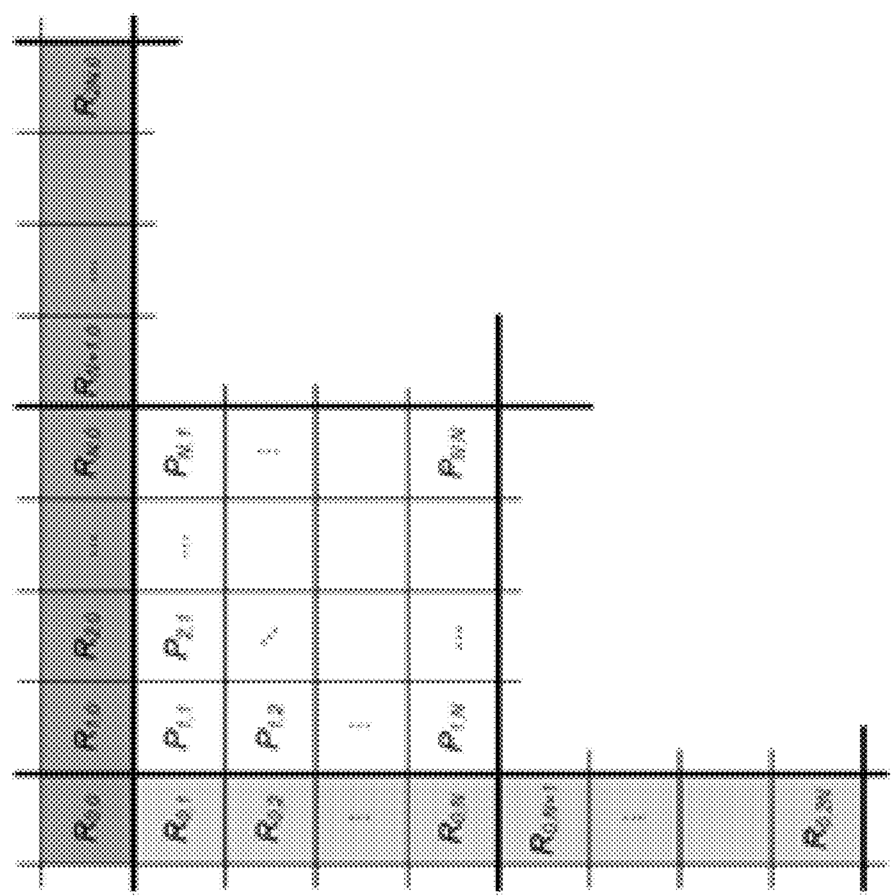
FIG. 10 illustrates reference samples Rx,y, which may be used (e.g., by a video coding device) for predicting samples Px,y.

FIG. 10 illustrates reference samples Rx,y, which may be used (e.g., by video encoder 20 and/or video decoder 30) for predicting samples Px,y.

Figure 11:
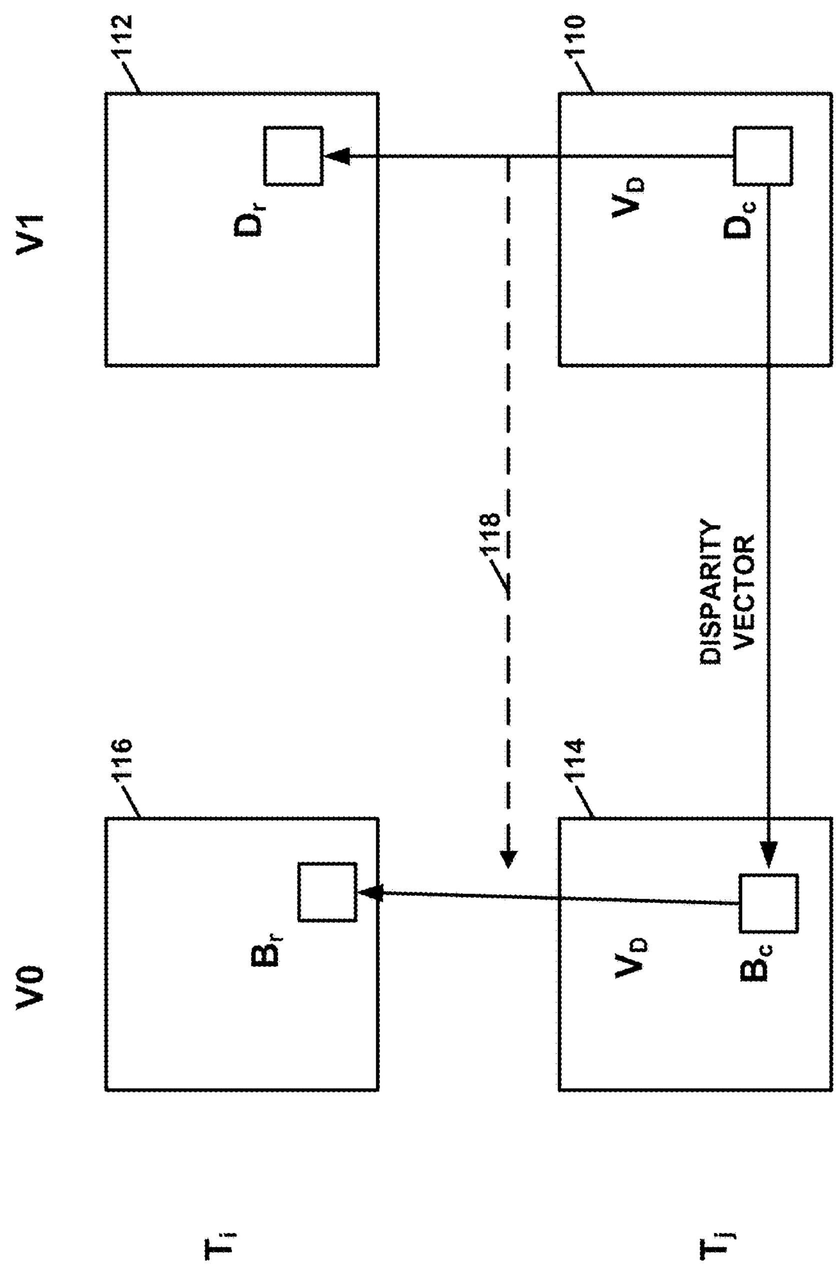
FIG. 11 is a conceptual diagram illustrating an example prediction structure of multi-view video coding.

FIG. 11 is a conceptual diagram illustrating an example prediction structure of multi-view video coding. As an example, a video coder (such as video encoder 20 or video decoder 30) may code a block in view V1 at time $T_8$ by predicting the video block using block $P_e$ in view V1 at time $T_0$. The video coder may subtract the original pixel values of the current block from $P_e$, thereby obtaining the residual samples of current block.

In addition, the video coder may locate a reference block at the reference view (view V0) by disparity vector 104. The differences of the original sample values of the reference block $I_b$ and the corresponding predicted samples $P_b$ are called the residual samples of the reference block, as denoted by $r_b$ in the equation below. In some examples, the video coder may subtract $r_b$ from the current residual and only transform code the resulting difference signal. Therefore, when inter-view residual prediction is used, the motion compensation loop can be expressed by the following equation:

$$\hat{I}_e = r_e + P_e + r_b$$

where the reconstruction of the current block $\hat{I}_e$ equals de-quantized coefficients $r_e$ plus prediction $P_e$ and quantization normalized residual coefficients $r_b$. Video coders may treat $r_b$ as the residual predictor. Thus, similar to motion compensation, $r_b$ may be subtracted from the current residual and only the resulting difference signal is transform coded.

The video coder may conditionally signal a flag to indicate the usage of inter-view residual prediction on a CU basis. For example, the video coder may traverse all transform units (TU) covered or partially covered by the residual reference region. If any of these TUs are inter-coded and contain a non-zero coded block flag (CBF) value (luma CBF or chroma CBF), the video coder may mark the related residual reference as available and the video coder may apply residual prediction. In this case, the video coder may signal a flag indicating the usage of inter-view residual prediction as part of the CU syntax. If this flag is equal to 1, the current residual signal is predicted using the potentially interpolated reference residual signal and only the difference is transmitted using transform coding. Otherwise, the residual of the current block is conventionally coded using the HEVC transform coding.

U.S. patent application Ser. No. 13/933,588, filed on 2 Jul. 2013, describes a generalized residual prediction (GRP) for scalable video coding. Although U.S. patent application Ser. No. 13/933,588 focuses on scalable video coding, the GRP techniques described in U.S. patent application Ser. No. 13/933,588 may be applicable to multi-view video coding (e.g., MV-HEVC and 3D-HEVC).

The general idea of GRP can be formulated, in the context of uni-prediction, as:

$$I_e = r_e + P_c + w * r_r,$$

In the formula above, $I_c$ denotes the reconstruction of a current frame in a current layer (or view), $P_c$ represents a temporal prediction from the same layer (or view), $r_c$ indicates a signaled residual, $r_r$ indicates a residual prediction from a reference layer, and w is a weighting factor. In some examples, the weighting factor may need to be coded in a bitstream or derived based on previously-coded information. This framework for GRP can be applied in cases of both single-loop decoding and multi-loop decoding. Multiple-loop decoding involves an unrestricted version of prediction of a block using the reconstructed and up-sampled lower resolution signal. To decode one block in an enhancement layer, multiple blocks in previous layers need to be accessed.

For instance, when video decoder 30 uses multi-loop decoding, GRP can be further formulated as:

$$I_c = r_c + P_c + w * (I_r - P_r),$$

In the formula above, $P_r$ indicates the temporal prediction for the current picture in the reference layer, $P_c$ represents a temporal prediction from the same layer (or view), $r_c$ indicates a signaled residual, w is a weighting factor, and $I_r$ denotes the full reconstruction of the current picture in the reference layer. The formulas above include a weighting factor that may be signaled in a bitstream or derived based on previously-coded information. In some examples, video encoder 20 may signal, in a bitstream, on a CU-by-CU basis, weighting indices used in GRP. Each weighting index may correspond to one weighting factor which is greater than or equal to 0. When a weighting factor for a current CU is equal to 0, the residual block of the current CU is coded using conventional HEVC transform coding. Otherwise, when the weighting factor for the current CU is greater than 0, the current residual signal (i.e., the residual block for the current CU) may be predicted using a reference residual signal multiplied by the weighting factor and only the difference is transmitted using transform coding. In some examples, the reference residual signal is interpolated.

Figure 12:
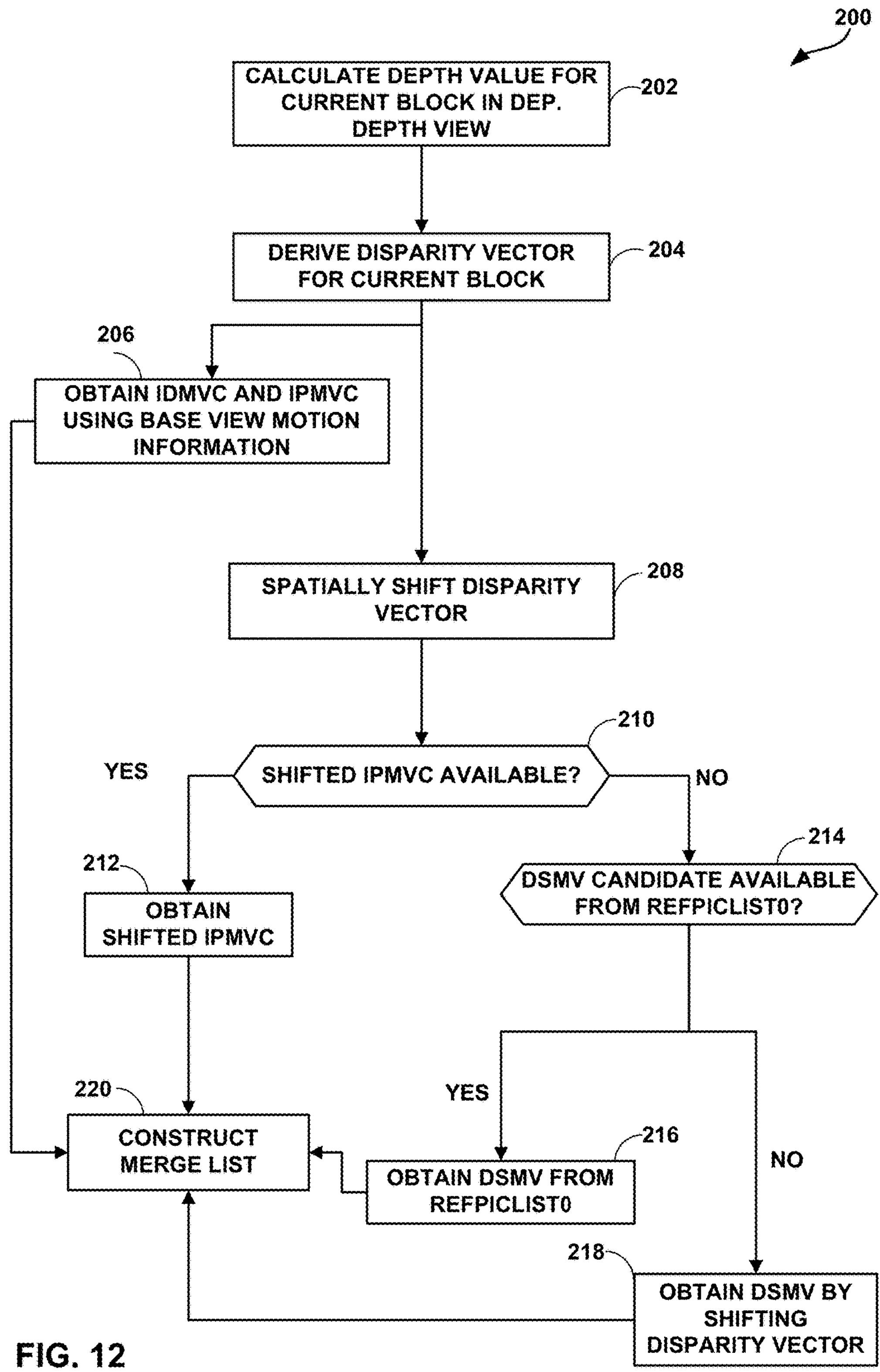
FIG. 12 is a flowchart illustrating an example process by which a video coding device may perform depth-oriented inter-view motion prediction techniques described herein.

FIG. 12 is a flowchart illustrating an example process 200 by which a video coding device may perform depth-oriented inter-view motion prediction techniques described herein. Although process 200 may be performed by a variety of devices in accordance with this disclosure, for ease of discussion purposes only, process 200 is described herein with respect to video decoder 30 of FIGS. 1 and 3. Additionally, while described with respect to video decoder 30, various components of video decoder 30, such as prediction unit 81, may perform one or more steps of process 200. In various examples, motion vector prediction unit 83 may perform one or more steps of process 200.

Process 200 may begin with video decoder 30 (e.g., prediction unit 81) calculating a depth value for a current video block in a dependent depth view (202). In examples, video decoder 30 may calculate the depth value based on neighboring pixels (or "neighboring samples") of the current block. For instance, video decoder 30 may calculate the depth value (or "reconstructed depth value") by calculating a weighted average of the individual depth values of the neighboring samples. In some examples, video decoder 30 may assign weights of five-sixteenths (5/16), six-sixteenths (6/16), and five-sixteenths (5/16) to each of the above-left, above-right, and below-left neighboring samples, respectively. In one example, video decoder 30 (e.g., prediction unit 81) may add an offset value while calculating the weighted average to arrive at the reconstructed depth value for the current block. For instance, video encoder 20 may multiply each of the depth values associated with the neighboring samples by the numerator of the corresponding weight (e.g., 5, 6, and 5, respectively) to obtain a plurality of products. In turn, video encoder 20 may sum the products, and add an offset value (such as a value of 8). Additionally, video encoder 20 may divide the resulting sum by a value of 16.

Video decoder 30 (e.g., prediction unit 81, such as motion vector prediction unit 83) may derive a disparity vector for the current block from the reconstructed depth value (204). For instance, video decoder 30 may directly convert the reconstructed depth value to the disparity vector. In turn, video decoder 30 (e.g., prediction unit 81, such as motion vector prediction unit 83) may obtain an inter-view disparity motion vector candidate (IDMVC) and an inter-view predicted motion vector candidate (IPMVC) for the current block (206). More specifically, video decoder 30 may obtain the IDMVC and the IPMVC from a base depth view of the current block. In the case of the IDMVC, video decoder 30 may convert the disparity vector to the IDMVC. In the case of the IPMVC, video decoder 30 may derive or, in some instances, copy the already-coded motion information from the co-located block in the base depth view. In turn, video decoder 30 (e.g., prediction unit 81, such as motion vector prediction unit 83) may construct a merge list (220), based on determining whether to include one, both, or neither of the IDMVC and the IPMVC.

Video decoder 30 (e.g., prediction unit 81, such as motion vector prediction unit 83) may spatially shift the disparity vector (208). As shown in FIG. 12, in some examples, video decoder 30 may spatially shift the disparity vector (208) at least partially in parallel with obtaining the IPMVC and the IDMVC (206). For instance, video decoder 30 may shift the disparity vector horizontally by the value $M_1$, and vertically by the value $M_2$. The calculation of offset values $M_1$ and $M_2$ are described above with respect to FIG. 1. In turn, based on the shifted disparity vector, video decoder 30 (e.g., prediction unit 81, such as motion vector prediction unit 83) may determine whether a corresponding shifted IPMVC is available from the base depth view (210). If video decoder 30 determines that a shifted IPMVC is available (YES branch of 210), then video decoder 30 may obtain the shifted IPMVC from the base depth view (212). For instance, video decoder 30 may locate a block in the base depth view using the shifted disparity vector associated with the current block, and may use the motion information of the already-coded located block, to derive the shifted IPMVC.

However, if video decoder 30 determines that the shifted IPMVC is not available (NO branch of 210), video decoder 30 (e.g., prediction unit 81, such as motion vector prediction unit 83) may determine whether a disparity shifted motion vector (DSMV) candidate is available from RefPicList0 associated with the neighboring blocks (214). If video decoder 30 determines that the DSMV candidate is available from RefPicList0 (YES branch of 214), video decoder may obtain the DSMV candidate directly from RefPicList0 (216). On the other hand, if video decoder 30 determines that the DSMV candidate is not available from RefPicList0 (NO branch of 214), then video decoder 30 may obtain the DSMV candidate by shifting the disparity vector (218). For instance, video decoder 30 may add an offset value to the disparity vector to obtain the DSMV candidate. Upon obtaining either the shifted IPMVC candidate or the DSMV candidate (at one of 212, 216, or 218), video decoder 30 may construct the merge list using the depth-oriented motion vector candidates and additional motion vector candidates (220).

As described with respect to process 200, video decoder 30 represents an example of a video decoder configured to perform various methods described in this disclosure. According to various examples described herein, video decoder 30 may be configured or otherwise operable to perform a method of coding video data, the method including determining a depth value associated with a block of video data included in a dependent depth view based on one or more neighboring pixels positioned adjacent to the block of video data in the dependent depth view, and generating a disparity vector associated with the block of video data based at least in part on the determined depth value associated with the block of video data. The method may further include generating an inter-view disparity motion vector candidate (IDMVC) based on the disparity vector, generating an inter-view predicted motion vector candidate (IPMVC) associated with the block of video data based on a corresponding block of video data in a base view, and determining whether to add any of the IDMVC or the IPMVC to a merge candidate list associated with the block of video data. In various examples, determining whether to add any of the IDMVC or the IPMVC to the merge candidate list may include determining whether to add one, both, or neither of the IDMVC or the IPMVC to the merge candidate list. In some examples, determining the depth value may include calculating a weighted average of values associated with the one or more neighboring pixels. In some examples, the one or more neighboring pixels include an above-left pixel, an above-right pixel, and a below-right pixel with respect to the block of video data. In some examples, calculating the weighted average comprises applying weights of five (5), six (6), and five (5) to the above-left pixel, an above-right pixel, and a below-right pixel, respectively, to obtain a plurality of weighted values.

In some examples, calculating the weighted average further includes obtaining a sum based on the plurality of weighted values, and obtaining an offset sum based on an offset value and the sum. According to some examples, calculating the weighted average further includes dividing the offset sum by a predetermined value. In one such example, the offset value comprises a value of eight (8) and the predetermined value comprises a value of sixteen (16). According to some examples, determining the depth value comprises calculating at least one of a mean value, a median value, or a mode value associated with the one or more neighboring pixels. According to some examples, the block of video data is a coding unit (CU), and the generated disparity vector applies to all prediction units (PUs) included in the CU. In some examples, generating the IPMVC comprises deriving the IPMVC from the corresponding block of video data in the base view.

According to various examples, the method further includes shifting the disparity vector spatially to form a shifted disparity vector, and using the shifted disparity vector to locate a corresponding block of video data in the base view. In some such examples, the method further includes determining whether a shifted IPMVC is available from the located corresponding block of video data in the base view, and based on determining that the shifted IPMVC is available, determining whether to add the shifted IPMVC to the merge list. In some examples, each of one or more spatial neighboring blocks of the current block is associated with a respective reference picture list 0 and a respective reference picture list 1. In some such examples, the method further includes determining that the shifted IPMVC is not available from the base view, determining whether at least one respective reference picture list 0 associated with the spatial neighboring blocks contains a disparity motion vector, based on determining that the at least one respective reference picture list 0 associated with the spatial neighboring blocks contains the disparity motion vector, shifting a horizontal component of the disparity motion vector contained in the respective reference picture list 0 to form a disparity shifted motion vector (DSMV) candidate; and adding the DSMV candidate to the merge list.

In some examples, the method further includes determining that none of the respective reference picture lists 0 contains the disparity motion vector, applying an offset value to the disparity vector to form the DSMV candidate, and applying the DSMV candidate to the merge list. According to some examples, determining the depth value includes determining that the one or more neighboring pixels include only one available neighboring pixel, and inheriting a depth value of the one available neighboring pixel to form the depth value of the block of video data. In some examples, the method further includes determining that none of the one or more neighboring pixels is available, where generating the disparity vector comprises at least one of setting the disparity vector to a zero vector or setting the depth value associated with the block of video data to a default depth value.

Figure 13:
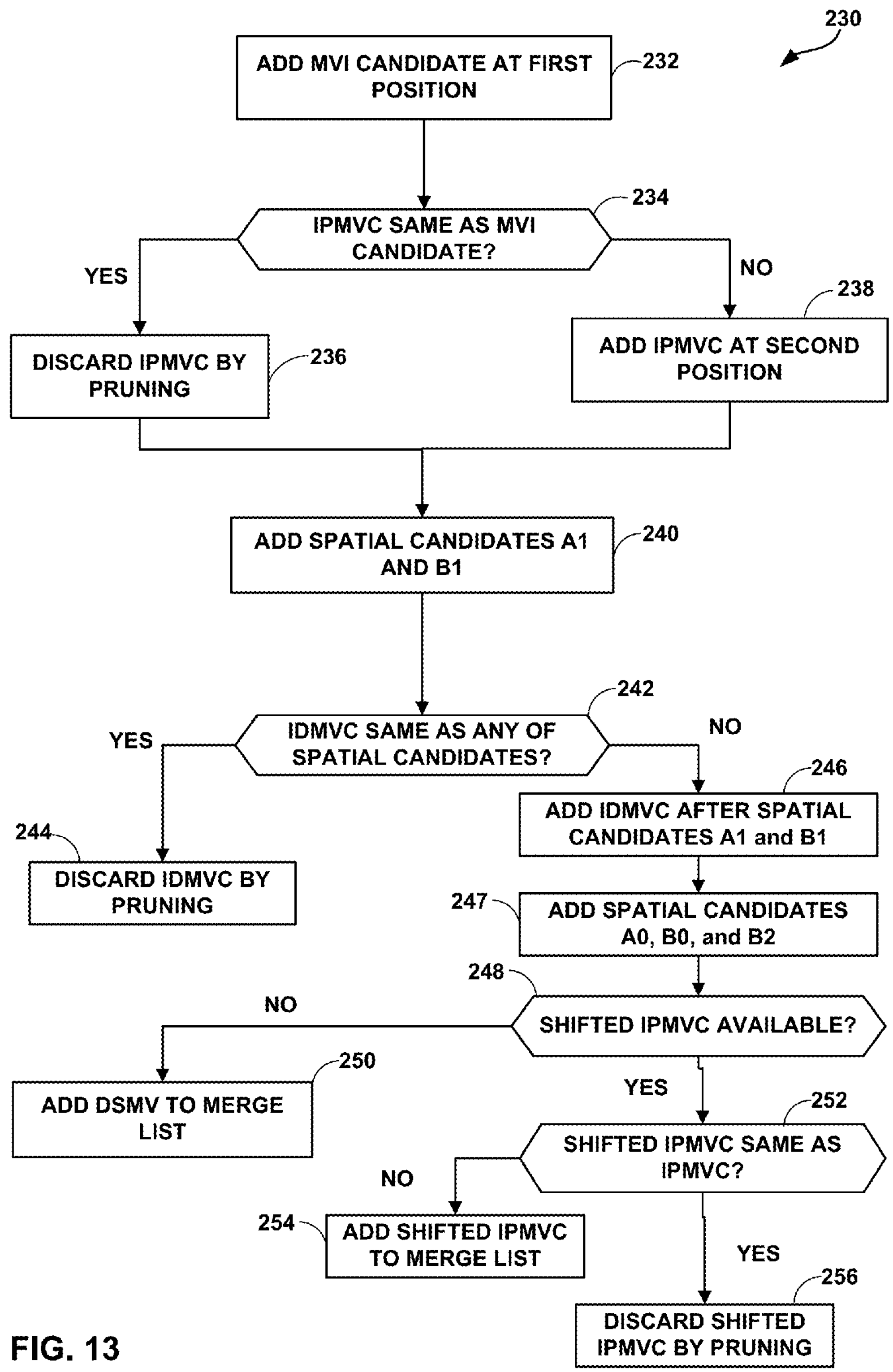
FIG. 13 is a flowchart illustrating an example process by which a video coding device may implement merge list construction using one or more depth-oriented inter-view motion vector candidates, in accordance with aspects of this disclosure.

FIG. 13 is a flowchart illustrating an example process 230 by which a video coding device may implement merge list construction using one or more depth-oriented inter-view motion vector candidates, in accordance with aspects of this disclosure. Although process 230 may be performed by a variety of devices in accordance with this disclosure, for ease of discussion purposes only, process 230 is described herein with respect to video decoder 30 of FIGS. 1 and 3. Additionally, it will be understood, that various components of video decoder 30 may perform one or more steps of process 230. An example of a component of video decoder 30 that may perform one or more portions of process 230 includes prediction unit 81 (such as motion vector prediction unit 83).

Process 230 may begin with video decoder 30 (e.g., prediction unit 81, such as motion vector prediction unit 83) adding a motion vector inheritance (MVI) candidate at a first position of a merge list (232). In turn, video decoder 30 may determine whether the IPMVC (derived as described above with respect to FIGS. 1, 2, and 12) is the same as the MVI candidate (234). If video decoder 30 determines that the IPMVC is the same as the MVI candidate (YES branch of 234), video decoder 30 may discard the IPMVC by pruning (236). Said another way, video decoder 30 (e.g., prediction unit 81, such as motion vector prediction unit 83) may prune the IPMVC against the MVI candidate.

However, if video decoder 30 determines that the IPMVC is different from the MVI candidate (NO branch of 234), video decoder 30 may add the IPMVC at the second position of the merge list (238). In other words, video decoder 30 (e.g., prediction unit 81, such as motion vector prediction unit 83) may insert the IPMVC immediately after the MVI candidate. Additionally, regardless of whether video decoder 30 pruned the IPMVC or added the IPMVC to the merge list (at 236 or 238 respectively), video decoder 30 may add any available candidate(s) of two spatial motion vector candidates, denoted by $A_1$ and $B_1$, to the merge list. For instance, video decoder 30 may add $A_1$ and $B_1$ at the two positions of the merge list that immediately follow the MVI candidate (if the IPMVC was pruned out), or that immediately follow the IPMVC (if the IPMVC was added to the merge list).

Additionally, video decoder 30 may determine whether the IDMVC (generated as described above with respect to FIGS. 1, 2, and 12) is the same as either $A_1$ or $B_1$ (242). If video decoder 30 determines that the IDMVC matches at least one of $A_1$ or $B_1$ (YES branch of 242), video decoder 30 may discard the IDMVC by pruning (244). However, if video decoder 30 determines that the IDMVC is different from both $A_1$ or $B_1$ (NO branch of 242), video decoder 30 may add the IDMVC to the merge list, at a position immediately after the available one(s) of $A_1$ and $B_1$ (246). In turn, video encoder may add any available candidate(s) of three spatial motion vector candidates, denoted by $A_0$, $B_0$, and $B_2$, to the merge list (247).

Video decoder 30 (e.g., prediction unit 81, such as motion vector prediction unit 83) may determine whether a shifted IPMVC is available (248). For instance, video decoder may determine whether the shifted IPMVC is available, by using a shifted disparity vector, as described above with respect to FIGS. 1, 2, and 12. If video decoder 30 determines that the shifted IPMVC is not available (NO branch of 248), video decoder 30 may add a disparity shifted motion vector (DSMV) candidate to the merge list (250). For instance, video encoder may add the DSMV at a position immediately after the last available one(s) of $A_0$, $B_0$, and $B_2$. Video decoder 30 (e.g., prediction unit 81, such as motion vector prediction unit 83) may derive the DSMV candidate as described above with respect to FIGS. 1, 2, and 12.

However, if video decoder 30 determines that the shifted IPMVC is available (YES branch of 248), video decoder 30 may determine whether the shifted IPMVC is the same as the IPMVC described above (252). If video decoder 30 determines that the shifted IPMVC is different from the IPMVC (NO branch of 252), video decoder 30 may add the shifted IPMVC to the merge list (254). For instance, video encoder may add the shifted IPMVC at a position immediately after the last available one(s) of $A_0$, $B_0$, and $B_2$. On the other hand, if video decoder 30 determines that the shifted IPMVC is the same as the IPMVC (YES branch of 252), video decoder 30 may discard the shifted IPMVC by pruning (256).

As described with respect to process 230, in accordance with various aspects of this disclosure, video decoder 30 may perform a method of coding video data, the method including comparing an inter-view predicted motion vector candidate (IPMVC) to a motion vector inheritance (MVI) candidate, where the IPMVC and the MVI candidate are each associated with a block of video data in a dependent depth view, and where the IPMVC is generated from a corresponding block of video data in a base depth view. The method may further include performing one of adding the IPMVC to a merge candidate list based on the IPMVC being different from the MVI candidate, or omitting the IPMVC from the merge candidate list based on the IPMVC being identical to the MVI candidate. In some examples, adding the IPMVC to the merge list includes performing one of inserting the IPMVC at an initial position within the merge candidate list based on the MVI candidate being unavailable for addition to the merge candidate list, or inserting the IPMVC at a position within the merge candidate list that follows a position of the MVI candidate within the merge candidate list based on the MVI candidate being available for addition to the merge candidate list. In various examples, the initial position is associated with an index value of zero (0). According to some examples, comparing the IPMVC to the MVI candidate includes comparing motion information associated with the IPMVC to corresponding motion information associated with the MVI candidate, and comparing at least one reference index associated with the IPMVC to at least one corresponding reference index associated with the MVI candidate.

In some examples, the method further includes comparing an inter-view disparity motion vector candidate (IDMVC) to an available one or more of a first spatial candidate associated with the merge candidate list and a second spatial candidate associated with the merge candidate list, where each of the IDMVC, the first spatial candidate, and the second spatial candidate is associated with the block of video data in the dependent depth view, and where the IDMVC is generated from a disparity vector associated with the block of video data. In some examples, the method further includes performing one of adding the IDMVC to the merge candidate list based on the IDMVC being different from each of the available one or more of the first spatial candidate and the second spatial candidate, or omitting the IDMVC from the merge candidate list based on the IDMVC being identical to at least one of the first spatial candidate or the second spatial candidate.

In some examples, adding the IDMVC to the merge candidate list includes inserting the IDMVC at a next available position within the merge candidate list. According to some examples, inserting the IDMVC at the next available position within the merge candidate list includes inserting the IDMVC at a position that follows a position of at least one of the first spatial candidate or a position of the second spatial candidate.

According to various examples, the method further includes determining that a shifted IPMVC is available, where the shifted IPMVC is associated with the block of video data in the dependent depth view, and where the shifted IPMVC is generated from the corresponding block of video data in the base depth view. In some such examples, the method further includes comparing the shifted IPMVC to the IPMVC. In some examples, the method further includes performing one of adding the shifted IPMVC to the merge candidate list based on the shifted IPMVC being different from the IPMVC and the merge candidate list including less than six (6) candidates, or omitting the shifted IPMVC from the merge candidate list based on the shifted IPMVC being identical to the IPMVC.

In some examples, the method further includes determining that a disparity shifted motion vector (DSMV) candidate is available, where the DSMV candidate is associated with the block of video data in the dependent depth view, and where the DSMV candidate is generated using one or more spatial neighboring blocks associated with the block of video data in the dependent depth view. According to some such examples, the method further includes adding the DSMV candidate to the merge candidate list, based on the merge candidate list including less than six (6) candidates. In some examples, adding the DSMV candidate to the merge candidate list includes inserting the DSMV candidate at a position that: 1) follows a position of a spatial candidate included in the merge candidate list, and 2) precedes a position of a temporal candidate included in the merge candidate list.

According to some examples, determining that the DSMV candidate is available is responsive to determining that a shifted IPMVC is not available, where the shifted IPMVC is associated with the block of video data in the dependent depth view, and where the shifted IPMVC is generated from the base view of the block of video data. In some examples, the DSMV candidate includes a disparity motion vector (DMV) selected from a reference picture list 0 (RefPicList0) associated with at least one spatial neighboring sample of the one or more spatial neighboring samples. According to some examples, the DSMV candidate is generated by shifting a disparity vector associated with the block of video data in the dependent depth view, and the disparity vector is generated from one or more depth values associated with the one or more spatial neighboring blocks associated with the block of video data in the dependent depth view.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:

comparing an inter-view predicted motion vector candidate (IPMVC) to a motion vector inheritance (MVI) candidate, wherein the IPMVC and the MVI candidate are each associated with a block of video data in a dependent depth view, wherein the MVI candidate associated with the block in the dependent depth view reuses one or more motion vectors and one or more reference indices corresponding to the one or more motion vectors available from a block of video data in a texture view that corresponds to the block of video data in the dependent depth view, and wherein the IPMVC is generated from a block of video data in a reference depth view that corresponds to the block of video data in the dependent depth view; and performing one of:

adding the IPMVC to a merge candidate list based on the IPMVC being different from the MVI candidate, or omitting the IPMVC from the merge candidate list based on the IPMVC being identical to the MVI candidate, wherein the merge candidate list includes a plurality of motion parameters associated with one or more neighboring blocks of the block of video data in the dependent depth view.

2. The method of claim 1, wherein adding the IPMVC to the merge list comprises performing one of:

inserting the IPMVC at an initial position within the merge candidate list based on the MVI candidate being unavailable for addition to the merge candidate list, or inserting the IPMVC at a position within the merge candidate list that follows a position of the MVI candidate within the merge candidate list based on the MVI candidate being available for addition to the merge candidate list.

3. The method of claim 1, wherein comparing the IPMVC to the MVI candidate comprises:

comparing motion information associated with the IPMVC to corresponding motion information associated with the MVI candidate; and comparing at least one reference index associated with the IPMVC to at least one corresponding reference index associated with the MVI candidate.

4. The method of claim 1, further comprising:

determining that a shifted IPMVC is available, wherein the shifted IPMVC is associated with the block of video data in the dependent depth view, and wherein the shifted IPMVC is generated from the corresponding block of video data in the reference depth view; and comparing the shifted IPMVC to the IPMVC.

5. The method of claim 4, further comprising:

performing one of adding the shifted IPMVC to the merge candidate list based on the shifted IPMVC being different from the IPMVC and the merge candidate list including less than six (6) candidates, or omitting the shifted IPMVC from the merge candidate list based on the shifted IPMVC being identical to the IPMVC.

6. The method of claim 1, wherein the one or more neighboring blocks of the block of video data in the dependent depth view include one or more spatial neighboring blocks associated with the block of video data in the dependent depth view, the method further comprising:

determining that a disparity shifted motion vector (DSMV) candidate is available, wherein the DSMV candidate is associated with the block of video data in the dependent depth view, and wherein the DSMV candidate is generated using one or more spatial neighboring blocks associated with the block of video data in the dependent depth view.

7. The method of claim 6, further comprising adding the DSMV candidate to the merge candidate list, based on the merge candidate list including less than six (6) candidates.

8. The method of claim 7, wherein adding the DSMV candidate to the merge candidate list comprises inserting the DSMV candidate at a position that: 1) follows a position of a spatial neighbor candidate included in the merge candidate list, and 2) precedes a position of a temporal neighbor candidate included in the merge candidate list.

9. The method of claim 6, wherein determining that the DSMV candidate is available is responsive to determining that a shifted IPMVC is not available, wherein the shifted IPMVC is associated with the block of video data in the dependent depth view, and wherein the shifted IPMVC is generated from the reference depth view.

10. The method of claim 6, wherein the DSMV candidate comprises a disparity motion vector (DMV) selected from a reference picture list 0 (RefPicList0) associated with at least one spatial neighboring block of the one or more spatial neighboring blocks associated with the block of video data in the dependent depth view.

11. The method of claim 6, wherein the DSMV candidate is generated by shifting a disparity vector associated with the block of video data in the dependent depth view, and wherein the disparity vector is generated from one or more depth values associated with the one or more spatial neighboring blocks associated with the block of video data in the dependent depth view.

12. A device for coding video data, the device comprising:

a memory; and one or more processors in communication with the memory, the one or more processors being configured to:

compare an inter-view predicted motion vector candidate (IPMVC) to a motion vector inheritance (MVI) candidate, wherein the IPMVC and the MVI candidate are each associated with a block of video data in a dependent depth view, wherein the MVI candidate associated with the block in the dependent depth view reuses one or more motion vectors and one or more reference indices corresponding to the one or more motion vectors available from a block of video data in a texture view that corresponds to the block of video data in the dependent depth view, and wherein the IPMVC is generated from a corresponding block of video data in a reference depth view that corresponds to the block of video data in the dependent depth view; and perform one of adding the IPMVC to a merge candidate list based on the IPMVC being different from the MVI candidate, or omitting the IPMVC from the merge candidate list based on the IPMVC being identical to the MVI candidate, wherein the merge candidate list includes a plurality of motion parameters associated with one or more neighboring blocks of the block of video data in the dependent depth view.

13. The device of claim 12, wherein, to add the IPMVC to the merge list, the one or more processors are further configured to:

insert the IPMVC at an initial position within the merge candidate list based on the MVI candidate being unavailable for addition to the merge candidate list and insert the IPMVC at a position within the merge candidate list that follows a position of the MVI candidate within the merge candidate list based on the MVI candidate being available for addition to the merge candidate list.

14. The device of claim 12, wherein, to compare the IPMVC to the MVI candidate, the one or more processors are configured to:

compare motion information associated with the IPMVC to corresponding motion information associated with the MVI candidate; and compare at least one reference index associated with the IPMVC to at least one corresponding reference index associated with the MVI candidate.

15. The device of claim 12, wherein the one or more processors are further configured to:

determine that a shifted IPMVC is available, wherein the shifted IPMVC is associated with the block of video data in the dependent depth view, and wherein the shifted IPMVC is generated from the corresponding block of video data in the reference depth view; and compare the shifted IPMVC to the IPMVC.

16. The device of claim 15, wherein the one or more processors are further configured to:

perform one of adding the shifted IPMVC to the merge candidate list based on the shifted IPMVC being different from the IPMVC and the merge candidate list including less than six (6) candidates, or omitting the shifted IPMVC from the merge candidate list based on the shifted IPMVC being identical to the IPMVC.

17. The device of claim 12, wherein the one or more neighboring blocks of the block of video data in the dependent depth view include one or more spatial neighboring blocks associated with the block of video data in the dependent depth view, and wherein the one or more processors are further configured to:

determine that a disparity shifted motion vector (DSMV) candidate is available, wherein the DSMV candidate is associated with the block of video data in the dependent depth view, and wherein the DSMV candidate is generated using one or more spatial neighboring blocks associated with the block of video data in the dependent depth view.

18. The device of claim 17, wherein the one or more processors are further configured to add the DSMV candidate to the merge candidate list, based on the merge candidate list including less than six (6) candidates.

19. The device of claim 17, wherein, to add the DSMV candidate to the merge candidate list, the one or more processors are configured to insert the DSMV candidate at a position that: 1) follows a position of a spatial neighbor candidate included in the merge candidate list, and 2) precedes a position of a temporal neighbor candidate included in the merge candidate list.

20. The device of claim 17, wherein, to determine that the DSMV candidate is available, the one or more processors are configured to determine that the DSMV candidate is available responsive to determining that a shifted IPMVC is not available, wherein the shifted IPMVC is associated with the block of video data in the dependent depth view, and wherein the shifted IPMVC is generated from the reference depth view.

21. The device of claim 17, wherein the DSMV candidate comprises a disparity motion vector (DMV) selected from a reference picture list 0 (RefPicList0) associated with at least one spatial neighboring block of the one or more spatial neighboring blocks associated with the block of video data in the dependent depth view.

22. The device of claim 17, wherein the DSMV candidate is generated based on a shifting of a disparity vector associated with the block of video data in the dependent depth view, and wherein the disparity vector is generated from one or more depth values associated with the one or more spatial neighboring blocks associated with the block of video data in the dependent depth view.

23. A non-transitory computer-readable storage medium encoded with instructions that, when executed, cause one or more processors of a video coding device to:

compare an inter-view predicted motion vector candidate (IPMVC) to a motion vector inheritance (MVI) candidate, wherein the IPMVC and the MVI candidate are each associated with a block of video data in a dependent depth view, wherein the MVI candidate associated with the block in the dependent depth view reuses one or more motion vectors and one or more reference indices corresponding to the one or more motion vectors available from a block of video data in a texture view that corresponds to the block of video data in the dependent depth view, and wherein the IPMVC is generated from a block of video data in a reference depth view that corresponds to the block of video data in the dependent depth view; and perform one of:

adding the IPMVC to a merge candidate list based on the IPMVC being different from the MVI candidate, or omitting the IPMVC from the merge candidate list based on the IPMVC being identical to the MVI candidate, wherein the merge candidate list includes a plurality of motion parameters associated with one or more neighboring blocks of the block of video data in the dependent depth view.

24. An apparatus for coding video data, the apparatus comprising:

means for comparing an inter-view predicted motion vector candidate (IPMVC) to a motion vector inheritance (MVI) candidate, wherein the IPMVC and the MVI candidate are each associated with a block of video data in a dependent depth view, wherein the MVI candidate associated with the block in the dependent depth view reuses one or more motion vectors and one or more reference indices corresponding to the one or more motion vectors available from a block of video data in a texture view that corresponds to the block of video data in the dependent depth view, and wherein the IPMVC is generated from a block of video data in a reference depth view that corresponds to the block of video data in the dependent depth view;

means for adding, based on the IPMVC being different from the MVI candidate, the IPMVC to a merge candidate list; and means for omitting, based on the IPMVC being identical to the MVI candidate the IPMVC from the merge candidate list, wherein the merge candidate list includes a plurality of motion parameters associated with one or more neighboring blocks of the block of video data in the dependent depth view.

25. The apparatus of claim 24, wherein the motion parameters include one or more motion vectors.

26. The apparatus of claim 25, wherein the merge candidate list includes a respective index for each respective motion vector of the one or more motion vectors.

27. The device of claim 12, wherein the motion parameters include one or more motion vectors.

28. The device of claim 27, wherein the merge candidate list includes a respective index for each respective motion vector of the one or more motion vectors.

29. The method of claim 1, wherein the motion parameters include one or more motion vectors.

30. The method of claim 29, wherein the merge candidate list includes a respective index for each respective motion vector of the one or more motion vectors.

* * * * *